(12) United States Patent
Ashoff

(10) Patent No.: US 10,237,941 B2
(45) Date of Patent: Mar. 19, 2019

(54) LIGHTING DEVICE OPERATING AT DIFFERENT POWER LEVELS

(71) Applicant: Richard d. Ashoff, Newport Beach, CA (US)

(72) Inventor: Richard d. Ashoff, Newport Beach, CA (US)

(*) Notice: Subject to any disclaimer, the term of this patent is extended or adjusted under 35 U.S.C. 154(b) by 0 days.

(21) Appl. No.: 15/583,213

(22) Filed: May 1, 2017

(65) Prior Publication Data

US 2017/0238388 A1    Aug. 17, 2017

Related U.S. Application Data

(63) Continuation of application No. 13/552,624, filed on Jul. 18, 2012, now Pat. No. 9,642,213.

(Continued)

(51) Int. Cl.
*H05B 37/02* (2006.01)
*H05B 33/08* (2006.01)
(Continued)

(52) U.S. Cl.
CPC .......... *H05B 33/0854* (2013.01); *F24F 11/30* (2018.01); *F24F 11/62* (2018.01);
(Continued)

(58) Field of Classification Search
CPC . H05B 37/02; H05B 37/0218; H05B 37/0227
See application file for complete search history.

(56) References Cited

U.S. PATENT DOCUMENTS 5,471,119 A    11/1995  Ranganath et al.
5,697,175 A    12/1997  Schwartz
(Continued)

FOREIGN PATENT DOCUMENTS

KR    10-2010-0004603 A    1/2010

OTHER PUBLICATIONS

International Search Report issued in International Application No. PCT/US2012/047256, dated Jan. 28, 2013.
(Continued)

*Primary Examiner* — Alexander H Taningco
*Assistant Examiner* — Kurtis R Bahr
(74) *Attorney, Agent, or Firm* — Mintz Levin Cohn Ferris Glovsky and Popeo, P.C.

(57) ABSTRACT

The current subject matter relates to a lighting device that can be installed in an already existing fixture in a structure. The lighting device can include a light emitting diode (LED) lighting segment and a fluorescent lighting segment. The LED lighting segment can include a LED lighting source, and the fluorescent lighting segment can include a fluorescent lighting source. The LED lighting source can be activated. Motion sensors and/or occupancy sensors can detect motion and/or occupancy of an occupant in the structure. If there is motion or if the occupancy is more than a predetermined threshold, the fluorescent lighting source can be activated. After each regular interval of time, the detection of motion or occupancy can be re-performed. If there is no detection of motion and/or occupancy, the fluorescent lighting source can be deactivated, after a period of time. Related apparatus, systems, techniques and articles are also described.

12 Claims, 20 Drawing Sheets

Related U.S. Application Data

(60) Provisional application No. 61/629,791, filed on Nov. 28, 2011, provisional application No. 61/629,142, filed on Nov. 14, 2011, provisional application No. 61/457,952, filed on Jul. 18, 2011.

(51) Int. Cl.
| | | |
|---|---|---|
| *H05B 35/00* | (2006.01) | |
| *F24F 11/62* | (2018.01) | |
| *F24F 11/30* | (2018.01) | |
| *G05B 19/048* | (2006.01) | |
| *H05B 41/38* | (2006.01) | |
| *F24F 11/63* | (2018.01) | |

(52) U.S. Cl.
CPC ....... *G05B 19/048* (2013.01); *H05B 33/0803* (2013.01); *H05B 33/0845* (2013.01); *H05B 35/00* (2013.01); *H05B 37/0227* (2013.01); *H05B 37/0272* (2013.01); *H05B 37/0281* (2013.01); *H05B 41/38* (2013.01); *F24F 11/63* (2018.01); *G05B 2219/2614* (2013.01); *G05B 2219/2642* (2013.01); *Y02B 20/44* (2013.01); *Y10T 29/49002* (2015.01); *Y10T 307/766* (2015.04)

(56) References Cited

U.S. PATENT DOCUMENTS

| | | | |
|---|---|---|---|
| 8,214,084 B2* | 7/2012 | Ivey | H05B 33/0803 700/275 |
| 8,382,315 B2* | 2/2013 | Lee | F21V 23/02 362/217.08 |
| 8,653,984 B2* | 2/2014 | Ivey | F21V 33/0076 340/815.4 |
| 8,896,207 B2* | 11/2014 | Thomas | H05B 33/0809 315/185 R |
| 9,642,213 B2 | 5/2017 | Ashoff | |
| 2001/0034148 A1 | 10/2001 | Holzer | |
| 2004/0012959 A1 | 1/2004 | Robertson et al. | |
| 2004/0124338 A1 | 7/2004 | Cloutier et al. | |
| 2006/0193131 A1 | 8/2006 | McGrath et al. | |
| 2009/0251058 A1* | 10/2009 | Chen | H05B 37/0218 315/159 |
| 2010/0102960 A1* | 4/2010 | Simon | F21V 33/0076 340/540 |
| 2010/0106306 A1 | 4/2010 | Simon et al. | |
| 2010/0231400 A1 | 9/2010 | Von Mohr et al. | |
| 2010/0237695 A1 | 9/2010 | Covaro et al. | |
| 2010/0295483 A1 | 11/2010 | Ashoff et al. | |
| 2011/0080091 A1 | 4/2011 | Staab et al. | |
| 2011/0121654 A1 | 5/2011 | Recker et al. | |
| 2011/0148309 A1 | 6/2011 | Reid et al. | |
| 2011/0163672 A1 | 7/2011 | Shew et al. | |
| 2011/0241567 A1 | 10/2011 | Covaro et al. | |
| 2012/0161666 A1* | 6/2012 | Antony | H05B 33/0809 315/294 |
| 2012/0229040 A1* | 9/2012 | Brown | H05B 33/0824 315/200 R |
| 2012/0274222 A1* | 11/2012 | Verfuerth | H05B 37/0227 315/158 |
| 2013/0051008 A1* | 2/2013 | Shew | H02J 9/065 362/235 |
| 2013/0221867 A1 | 8/2013 | Deppe et al. | |

OTHER PUBLICATIONS techterms.com, Gateway Definition, WayBackMachine.org, Jul. 3, 2008. 1 page.

* cited by examiner

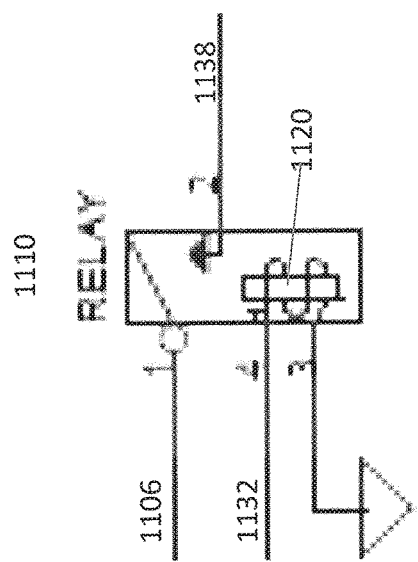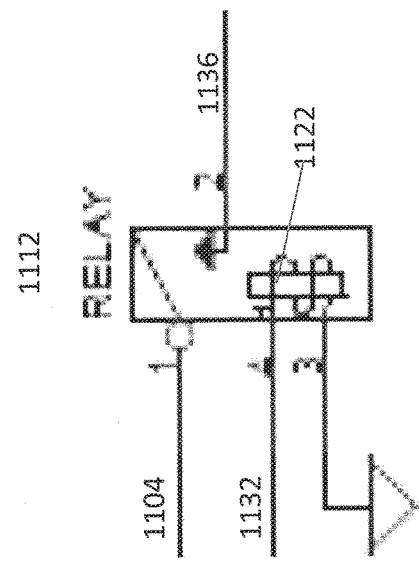
FIG. 12

| | | Wireless Networking Technologies | | | | | Wired Technologies | |
|---|---|---|---|---|---|---|---|---|
| | ZigBee® | Hybrid WirelessHART™ | Bluetooth® | UWB™ (Ultra Wide Band) | Wi-Fi™ | Wi-Max™ | LonWorks® | Wired |
| Standard | IEEE® 802.15.4 | | IEEE 802.15.1 | IEEE 802.15.3a | IEEE 802.11a, b, g | IEEE 802.16-2004 | EIA 709.1, 2, 3 | |
| Industry Organizations or Governing Body | ZigBee Alliance | ISA100 and HART Comm. Foundation www.hartcomm.org | Bluetooth SIG | UWB Forum and WiMedia™ Alliance | Wi-Fi Alliance | Wi-MAX Forum | LonMark Interoperability Assoc. | |
| Device Addressing | | Hardware/Software | | | | | | |
| Type of Network | | Device Bus (Process Automation) | | | | | | |
| Topology Mesh, Star, Tree | Star, Mesh | Star, Wireless Mesh | Star | Star | Medium dependent | | P2P, Star, Mesh | P2P, Star, Mesh |
| Physical Media | | Legacy 4-20mA analog instrumentation wiring or 2.4GHz Wireless | | | | | | |
| RF Frequency | 868/915 MHz, 2.5 GHz | 900 MHz or 2.4 GHz | 2.4 GHz | 3.1-10.6 GHz | 2.4 GHz, 5.8 GHz | 10-66 GHz | N/A (wired technology) | N/A (wired technology) |
| Data Rate | 250 Kbps | ds on Physical Layer em | 723 Kbps | 110 Mbps-1.6 Gbps | 10-105 Mbps | 5 Gbps | 15 Kbps-10 Mbps | |
| Range | 10-300m | 80m In. 200 m Outdoor | 10m | 4-20m | 10-100m | 6-10 Km | Medium dependent | Medium dependent |
| Power | Very low | Very low | Low | Low | High | High | Wired | Wired |
| Battery | Alkaline | Alkaline | Rechargeable | Rechargeable | N/A | N/A | Alkaline | |
| Operation (Life) | (Months-Years) | (Months-Years) | (Hours-Days) | (Hours) | (Months-Years) | (Months-Years) | (Months-Years) | (Months-Years) |
| Nodes | 65,000 | 64 in multidrop | 8 | 128 | 32 | | 32,000 | |

FIG. 18

LIGHTING DEVICE OPERATING AT DIFFERENT POWER LEVELS

CROSS-REFERENCE TO RELATED APPLICATIONS

This patent application is a continuation of and claims priority to U.S. patent application Ser. No. 13/552,624, filed on Jul. 18, 2012, and entitled "Lighting Device Operating at Different Power Levels", which claims priority to U.S. Provisional Patent Application Ser. No. 61/457,952, filed on Jul. 18, 2011, U.S. Provisional Patent Application Ser. No. 61/629,142, filed on Nov. 14, 2011, and U.S. Provisional Patent Application Ser. No. 61/629,791, filed on Nov. 28, 2011. This application is related to co-pending application for U.S. patent application Ser. No. (not yet assigned) entitled "Retrofit Lamp Configurations," by Richard d. Ashoff, filed on Jul. 16, 2012. The contents of these above-mentioned applications are all incorporated herein by reference in their entirety.

TECHNICAL FIELD

The subject matter described herein relates to lighting devices.

BACKGROUND

Some legal codes by legal institutions, such as in the United States, necessitate that some structures, such as parking lots and staircases, are required to have lights on twenty-four hours a day, three hundred and sixty-five days a year. This is typically provided using conventional lighting devices, such as electric bulbs and fluorescent lights. Keeping these lighting devices permanently in an on state uses a significant amount of energy. According to Energy Information Administration, which is a branch of the United States Department of Energy, lighting uses, on average, accounts for 25% of all the energy produced and used annually in the United States of America. Therefore, it can be advantageous to provide lighting devices that optimally utilize energy as the need arises, while still complying with the legal lighting requirements needed to provide proper illumination.

SUMMARY

In one aspect, a method is disclosed, the method comprising installing a lighting device in a container, with the lighting device comprising at least a first segment and a second segment, the first segment comprising a first lighting source, the second segment comprising a second lighting source. The second lighting source is activated, motion is detected using a detector and the first lighting source is activated based on the detecting of the motion.

In another aspect, a system is disclosed, wherein the system comprises a first segment comprising a first lighting source that activates with a high power and provides light with a high brightness. A second segment comprises a second lighting source that activates with a low power and provides light with a low brightness, a motion sensor that determines motion of an occupant, and a microprocessor that determines, based on the detection of motion, at least one of the first lighting source and the second lighting source that is to be activated.

In another aspect, a system is disclosed, wherein the system comprises at least one master lighting device, the master lighting device comprising at least a first segment, a second segment, a motion sensor; and a first microprocessor. The first segment comprises a first lighting source, the second segment comprises a second lighting source, with one of the first lighting source and the second lighting source being activated based on detection by the motion sensor. In addition, at least one slave lighting device is included, wherein the slave lighting device comprising a third lighting source and a second microprocessor that communicates with the first microprocessor to determine if the third lighting source is to be activated based on a command received by the second microprocessor from the first microprocessor.

In another aspect, a system is disclosed, wherein the system comprises a first segment comprising a first lighting source that activates with a high power and provides light with a high brightness and a second segment. The second segment comprises a second lighting source that activates with a low power and provides light with a low brightness; an occupancy sensor that determines occupancy; a microprocessor that determines, based on the detection of occupancy, at least one of the first lighting source and the second lighting source that is to be activated.

The subject matter described herein provides many advantages, some of which are noted below. For example, the lighting devices can optimize usage of energy while providing full safety in structures, such as parking structures, stairwells, buildings, shelters, and the like. Further, the lighting devices can be fit into previously existing fixtures, and can use previously implemented ballasts, thereby advantageously providing adaptability with existing fixtures. While in most implementations, the lighting device can be a single packaged structure that cannot be separated (that is, separated apart) into separate structures; in some implementations, the lighting device can be separated apart into separate structures.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

FIG. 12 illustrates relays;

FIG. 18 illustrates standards, wireless technologies, and wired technologies;

Like reference symbols in the various drawings indicate like elements.

DETAILED DESCRIPTION

To optimize the utilization of energy while complying with legal requirements, a lighting device is presented. This lighting device can have a first lighting segment, such as light emitting diode (LED) segment, and a second lighting segment, such as a fluorescent lighting segment. The LED segment can include a LED lighting source, and the fluorescent lighting segment can include a fluorescent lighting source. The LED lighting source can operate at a first power level, and the fluorescence lighting source can operate at a second power level. The first power level can be a low power level, and the second power level can be a high power level. The switching from the LED lighting source to the fluorescence lighting source can be based on an occurrence of an event, such as a new presence of an entity such as a person or a vehicle.

Figure 1:
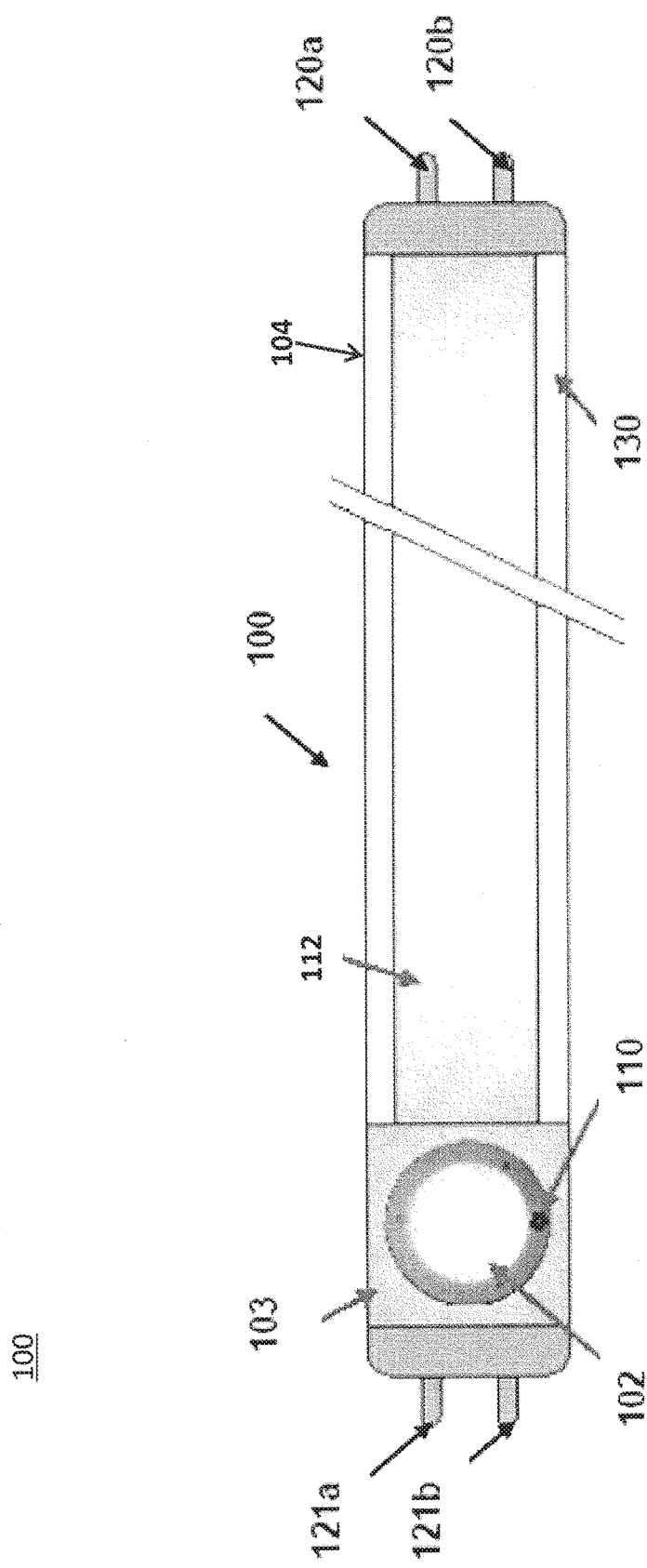
FIG. 1 illustrates an implementation of the lighting device.

FIG. 1 illustrates the lighting device 100 in accordance with some implementations of the current subject matter. The lighting device 100 can include a segment 103 and a fluorescence lighting segment 104. The segment 103 can include a LED lighting source 102, which can be made of one or more LEDs, and a detector or sensor 110. The detector 110 can detect motion of an occupant or entity, such as a person or persons, vehicle (that can be manually driven or automated), mobile storage-units, trash cans, and/or any other entity, increase in ambient temperate, or any other predetermine event. The detector 110 can be in the segment 103, the fluorescent lighting segment 104, or in neither. The fluorescent lighting segment 104 can include a fluorescent lighting source 112 (for example, a fluorescent tube) that can be enclosed by a tube or sleeve 130. Tube 130 can cover both the segment 103 and the fluorescence lighting segment 104 or just one of the segments. The fluorecent lighting source 112 can be a gas-discharge lighting source that can receive and use electricity so as to excite mercury vapor. The atoms of the excited mercury vapor can produce a short-wave ultraviolet lighting that can then cause a phosphor to fluoresce so as to produce visible light. The tube 130 can be made of glass, acrylic sheets, plastic, and/or the like. Some implementations of the tube 130 can be resistant or proof to shock, water, fire, impact, temperature, and/or the like. The lighting device 100 can further include end terminals 120a, 120b, 121a, and 121b. The end terminals 120a, 120b, 121a, and 121b can be male terminals that can combine with female terminals of a lighting container/fixture. Further, the lighting device 100 can include electrical wires.

In one implementation, the lighting device 100 can detect that the motion has stopped, using the detector 110. When the detector has ceased to detect motion, after a period of time, the fluorescent lighting source 112 can be deactivated and the LED lighting source 102 can be reactiviated. The period of time can be fixed (such as 15 seconds, 30 seconds, 1 minute, 5 minute, 10 minute, between 15 seconds and 10 minutes, between 15 seconds and 20 minutes, between 30 seconds and 10 minutes, between 30 seconds and 5 minutes, or the like) or the time period can be varied by a user. The time period can also be based on the length motion is detected by detector 110, such that the longer detector 110 detects motion, the longer the period of time.

In one example, the LED lighting source 102 can include three LEDs. Each LED of the three LEDs can be activated by a power of 1 watt. The three LEDs in the LED lighting source 103 can produce 180 lumens of luminous flux, which can be a measure of perceived power of visible light emitted by a lighting source. The fluorescent lighting source 112 in the fluorescent lighting segment 104 can be a linear flurescent lighting device that can use 32 watts of power, and can produce 3200 lumens of luminous flux. Therefore, $P_{LED\text{-}ligt\text{-}source} < P_{Fluorescent\text{-}light}$ and $LF_{LED\text{-}light\text{-}source} < LF_{Fluorescent\text{-}light}$, wherein P is power and LF is luminous flux.

Although the comparative relationships between power and luminous fluxes have been described above, in some other implementations, other comparative relationships can be possible, such as one of the following:

$$P_{LED\text{-}ligt\text{-}source} = P_{Fluorescent\text{-}light} \text{ and} \\ LF_{LED\text{-}ligt\text{-}source} < LF_{Fluorescent\text{-}light}; \text{ and}$$

$$P_{LED\text{-}ligt\text{-}source} = P_{Fluorescent\text{-}light} \text{ and} \\ LF_{LED\text{-}ligt\text{-}source} = LF_{Fluorescent\text{-}light}.$$

The fluorescent lighting source 112 in the fluorescent lighting segment 104 can be either a magnetic type tube or an electronic high frequency tube. The magnetic type tube can include current limiting inductors, and can be classified into a glow starter type and a rapid star type depending on ignition methods that can be used. The electronic high frequency tubes can convert alternating current (AC) power to direct current (DC) power, and can apply high frequency power to fluorescent tubes through high frequency resonance circuits. The electronic high frequency tubes can be classified into a current mode type tube and a voltage mode type tube.

To operate the fluorescent lighting source 112, the fluorescent lighting source 112 can be first ignited by an igniter and then can be maintained by a ballast. The ignition circuit can be formed of a high voltage generation circuit for generating electric discharge in a fluorescent lighting source 112, and a ballast having a negative resistance characteristic for maintaining the lighting operation of the fluorescent lighting source 112.

The LED lighting source 102 can advantageously be energy efficient by consuming lower energy and power than some other lighting sources, can be longer lasting by having a life of at least 50,000 hours, can have a small size, can have an adjustable color-temperature, can have a variable colorrendering-index, can have a dimming capability, can have a resistance to vibration, and can have other advantageous features. The LED lighting source 102 can be fit into the linear, tubular fixtures and apparatuses.

Figure 2:
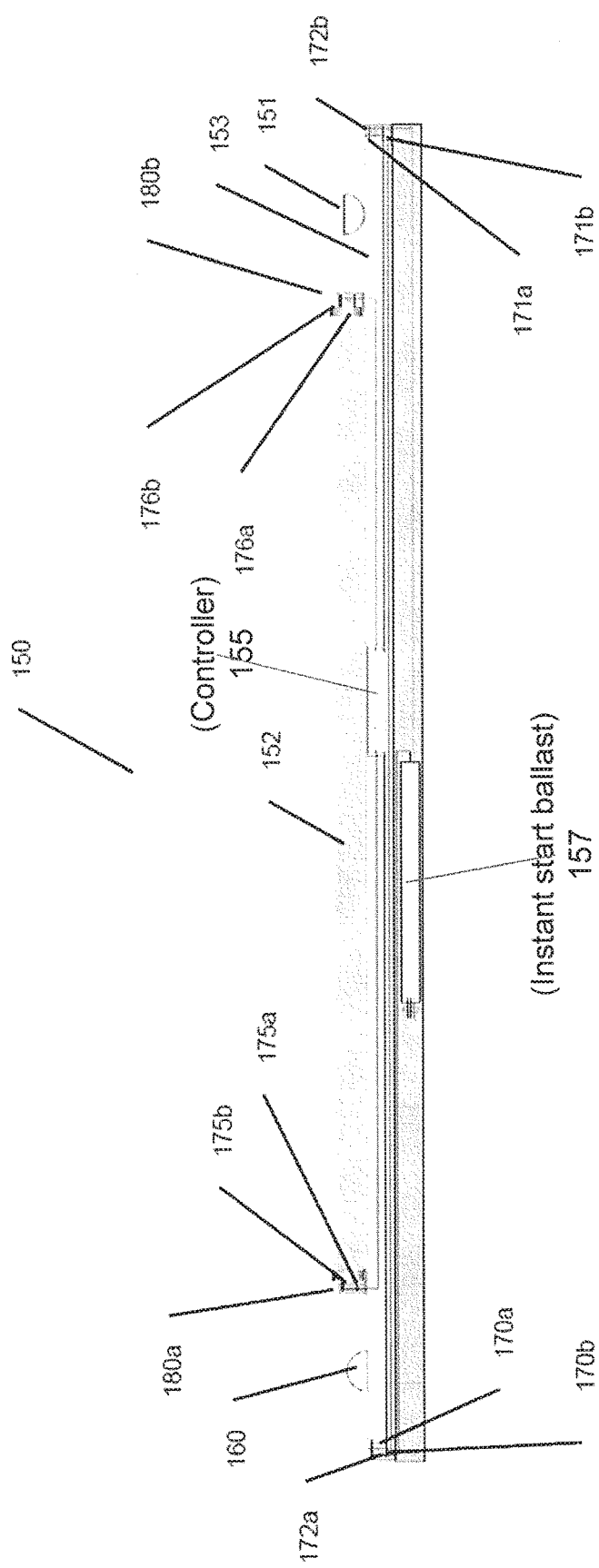
FIG. 2 illustrates an implementation of the lighting device.

FIG. 2 illustrates the lighting device 150 (for example, one that can be retrofit into existing, standard lighting fixtures or containers) in accordance with some implementations of the current subject matter. The lighting device 150 can have two lighting segments, a solid-state lighting or illuminating segment 151, and a fluorescent lamp segment 152, an electrical components compartment 153, a sensor or detector 160, and two sets of end terminals, the first set of end terminals 170*a*, 170*b* and 171*a*, 171*b* at each opposite end can fit into an existing lighting fixture having original sockets 172*a* and 172*b* at opposite ends; and the second set of end terminals 175*a*, 175*b* and 176*a*, 176*b* at each opposite end can fit into sockets 180*a* and 180*b* at opposite ends. The end terminals 170*a* and 170*b* and 171*a* and 171*b* of the lighting source 150 can have substantially the same length to fit into the original sockets 172*a* and 172*b* (for example, a standard, linear or straight tubular fluorescent with a length of 4 inches) of the existing apparatus or fixture. The fluorescent lamp segment 152 can also be a standard lamp (for example, a standard, linear or straight tubular fluorescent with a length of 36 inches) and can fit into sockets 180*a* and 180*b* at opposite ends to allow a standard lamp to be used. Also included in the lighting device 150 is a controller 155. In addition, the existing fixture may include a ballast 157. In this manner, the lighting source 150 can directly replace a fluorescent lamp in a fixture or apparatus without any modification or re-wiring of the fixture or any modification or re-wiring of the structure holding the fixture. Moreover, the lighting device 150 can also be replaced without any modification or re-wiring of the fixture or any modification or re-wiring of the structure holding the fixture. This solid-state lighting and fluorescent lamp arrangement can be considered a hybrid lighting device (or a hybrid retrofit lamp).

Figure 3:
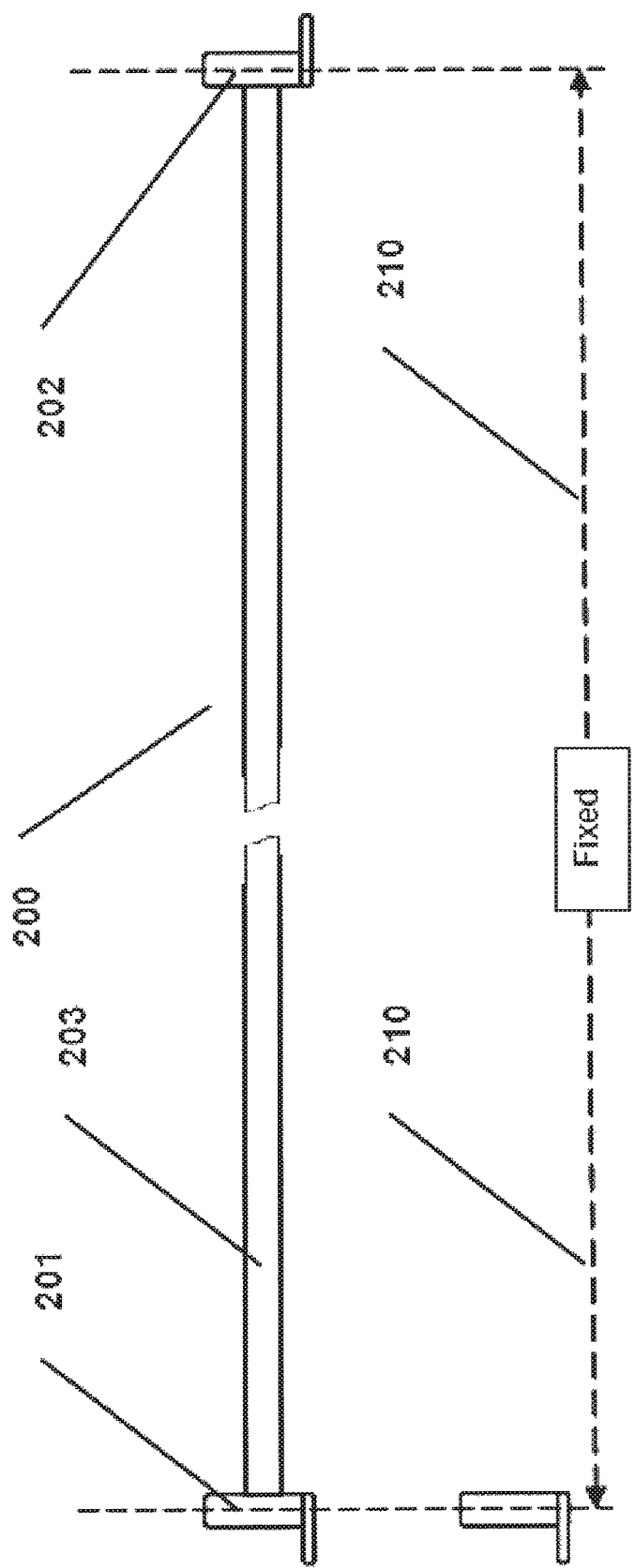
FIG. 3 illustrates ends of a container/fixture within which the lighting device can be incorporated or fitted.

FIG. 3 illustrates ends 201 and 202 of a container/fixture 200 within which the lighting device 203 can be fitted, in accordance with some implementations of the current subject matter. The lighting device 203 can fit into the female ends 201 and 202 of the container/fixture 200. This fitting can occur by inserting male terminals of the lighting device 203 into corresponding female terminals within ends 201 and 202 of the container/fixture 200. The length 210 of the container/fixture 200 can be fixed. The length of the lighting device 203 can be same as or slightly smaller than the length of the lighting device container/fixture 200 so that the lighting device 203 can fit into an existing lighting device container/fixture 200 (that is, a lighting device container/fixture 200 already includes a conventional lighting device) without changing electric wiring associated with the lighting device container/fixture 200. The length between the ends 201 and 202 can either be fixed or have a standard size (that is, standard according to industry standards, organizations, and/or other criteria—for example, 4 feet, 2 feet, 6 feet, or any other size), such as in existing containers/fixtures 200 that can be already implemented in structures, such as parking lots, stairways, and the like. Thus, the lighting source 203 can advantageously adjust in already existing containers/fixtures 200 without changing any wiring associated with the already existing container/fixture.

Although the length of the container/fixture 200 is shown as fixed or standard, in some other implementations, the length can be variable such that it can be varied by stretching/contracting the container/fixture 200 by pulling-outwards or pulling-inwards the ends 201 and 202 so as to fit the lighting device 203 within the container/fixture 200.

Further, FIG. 3 illustrates the lighting device 203 being placed into the ends 201 and 202 of the container/fixture in accordance with some implementations of the current subject matter. This allows the lighting device 203 to be placed in an existing container without the need of any hardware; all that may be required is to replace the existing light with lighting device 203. It can be as easy as changing a light bulb.

Thus, the lighting device can fit into standard/normal linear fluorescent lamp fixtures. The distance between the sockets 201 and 202 can be fixed. The lamp 203 can be a standard linear fluorescent lamp, such as a 4 foot T8 fluorescent lamp. The distance 210 between the sockets 201 and 202 can be fixed. Total length of the lighting device 100 or 150 can be substantially same as legacy lamps, such as standard fluorescent lamps so that no modification may be necessary in order for the lighting device 100 or 150 to fit into the apparatus (for example, the two opposite sockets of the apparatus) of an existing fixture. Thus, there is no requirement for modification to either the existing wiring or the existing fixture.

In addition to having the florescent lighting source 112 turn on when the sensor detects its predetermine event (such as motion), the sensor can also be programmed to send a signal to activate various other devices, such as a alarm, fire alarm, burger alarm, the thermostat to trigger AC or heating, magnetic door locks, electric blinds or shade, or any other electrical device.

FIGS. 4-8 illustrate steps that can occur according to an implementation when the sensor in the lighting device is triggered. The electrical system 400 can include a ballast 402, a first relay (Relay 1) 404, a second relay (Relay 2) 406, and the lighting device 100 including a fluorescent lighting segment 104 and a segment 103. The segment 103 can include one or more motion detectors 408, one or more microprocessors 410, one or more capacitors 412, and one or more LEDs 414. The ballast 402 can receive alternating current (AC) power, and can supply power to the relays 404 and 406. The ballast 402 can be an existing ballast of an existing apparatus or fixture. It is not necessary to modify the existing ballast or the existing fixture.

Figure 4:
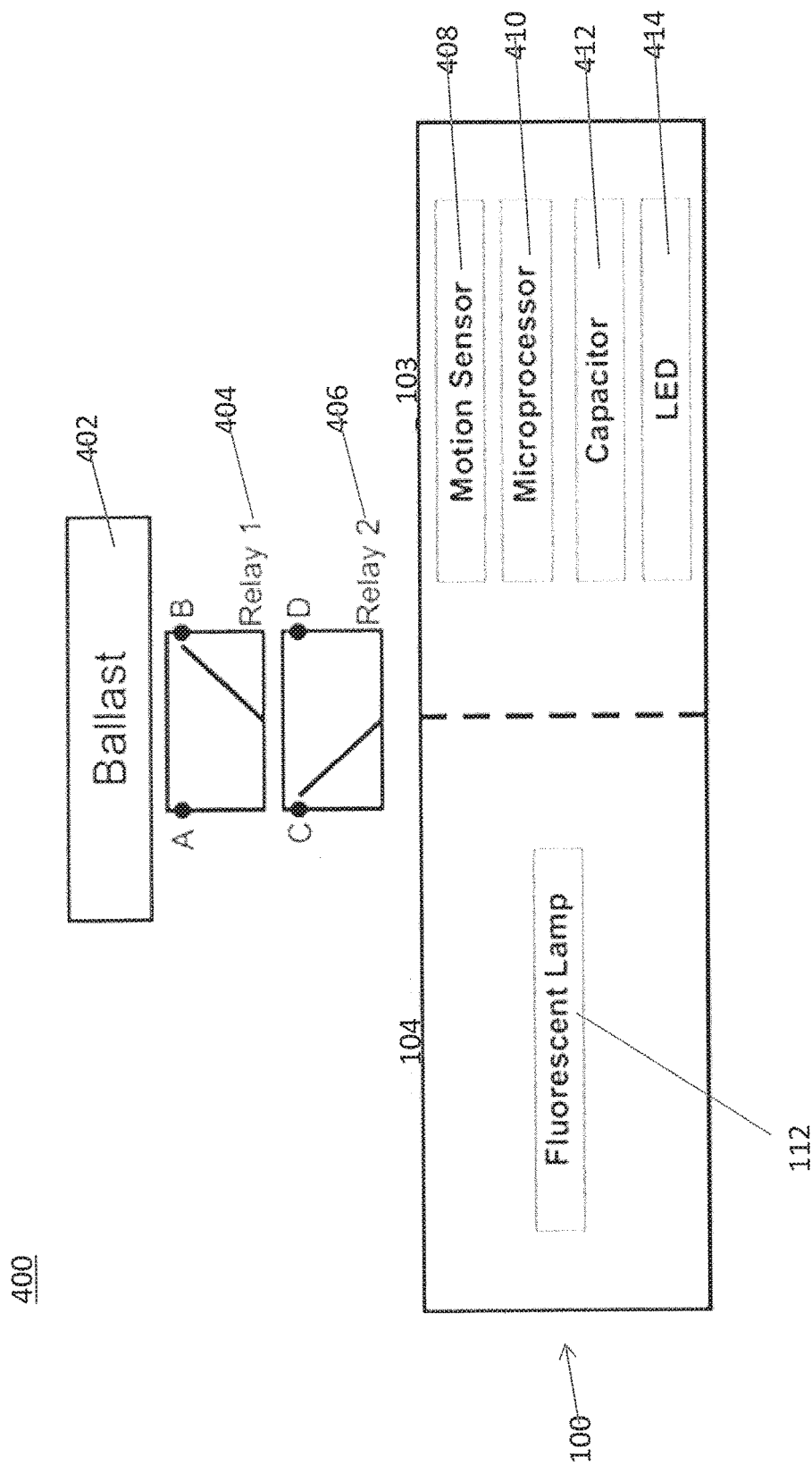
FIG. 4 illustrates one configuration of an electrical system of the lighting device.

FIG. 4 illustrates one configuration of an electrical system 400 in accordance with some implementations of the current subject matter. This configuration can characterize the first step. In this first step, the electric power from ballast 402 can supply power to the segment 103 through relay 404, whereby relay 404 can be preselected to be in position B, powering the components of the segment 103. Concurrently, relay 406 can be preselected to be in position C. The relay 406 at position C may perform no function and can be completely passive. In this manner, the fluorescent lamp 112 can be inactive (that is, off), but power can be supplied to the segment 103 so as to provide power to components of the segment 103. Illumination can be provided by the one or more LEDs 414 in this first step.

Figure 5:
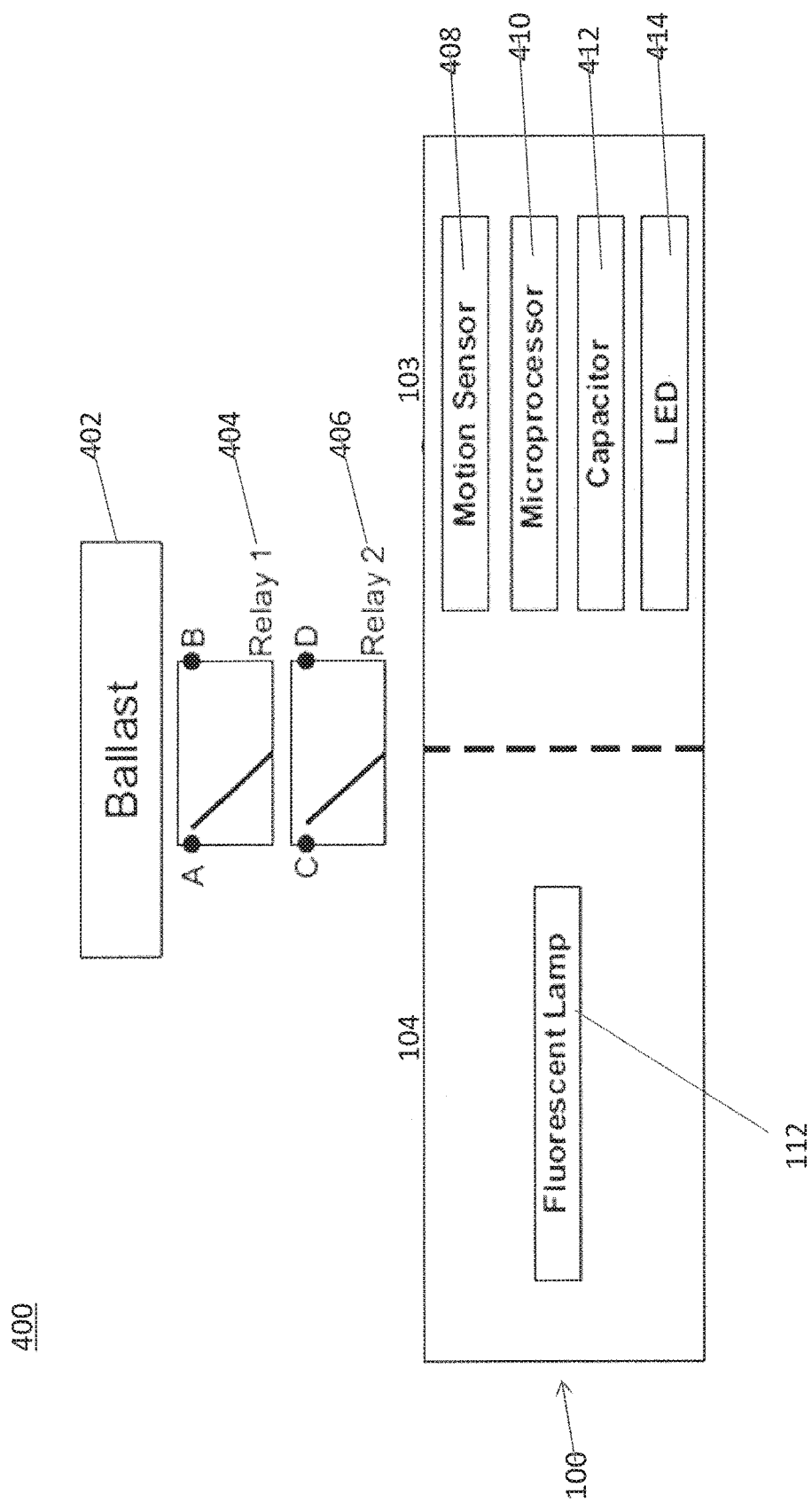
FIG. 5 illustrates a subsequent configuration of the electrical system of the lighting device.

FIG. 5 illustrates a subsequent configuration of the electrical system 400 in accordance with some implementations of the current subject matter. This configuration can characterize the second step. The sensor 408 can detects a motion or an occupant. The sensor 408 can send a signal to the microprocessor 410, whereby the relay 404 can switch to position A. Switching the relay to position A can power the components of the fluorescent lighting segment 104, thereby activating (that is, turning on) the fluorescent lamp 112. While relay 404 is switching, capacitor 412 provides power to microprocessor 410. Concurrently, the power to the segment 103 can be turned off so as to protect the segment 103 components that can operate at significantly lower voltage (for example, 12 Volts DC or lower) than voltage used by the fluorescent lighting segment 104 (for example, 110-230 Volts AC or higher). Thus, in this second step, illumination can be provided by fluorescent lamp 112.

Figure 6:
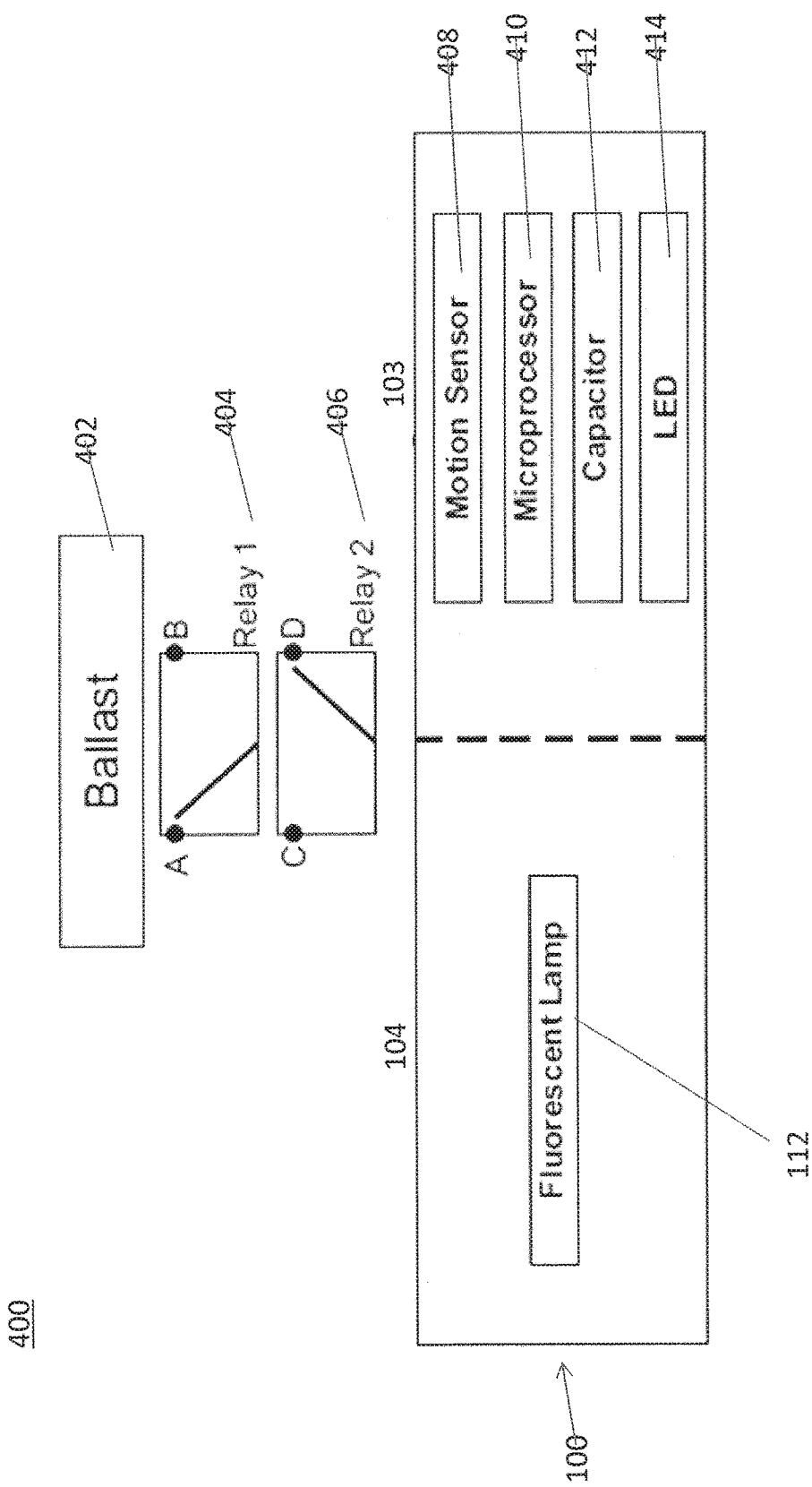
FIG. 6 illustrates a subsequent configuration of the electrical system of the lighting device.

FIG. 6 illustrates a next subsequent configuration of the electrical system 400 in accordance with some implementations of the current subject matter. This configuration can characterize the third step. A power source, such as one or more capacitors 412 (or any other power storage device) can provide power to the microprocessor 410. The microprocessor 410 can send a command to the relay 406 to switch to position D. This switching can provide power from ballast 402 to the components of segment 103. In this third step, the LEDs 414 can remain inactive (that is, off), if so predetermined. The microprocessor 410 can include a clocking device that can start a predetermined count (for example, 5 seconds, 60 seconds, 300 seconds, 900 seconds, etc.) to proceed to the next step (that is, the fourth step). As long as the sensor detects its predetermine event (such as motion), the relay 406 can remain in position D, power can be provided from ballast 402 to the components of the segment 103, fluorescent lamp 112 can remain activated (that is on), and the clocking device of the microprocessor 410 can start counting from zero or any other number (if so predetermined) before proceeding to the fourth step. There may be no limit as to the number of sensed events (for example motion, etc.) and upon the occurrence of each event, the clocking device of the microprocessor 410 can start counting from zero (if so predetermined) before proceeding to the fourth step.

Figure 7:
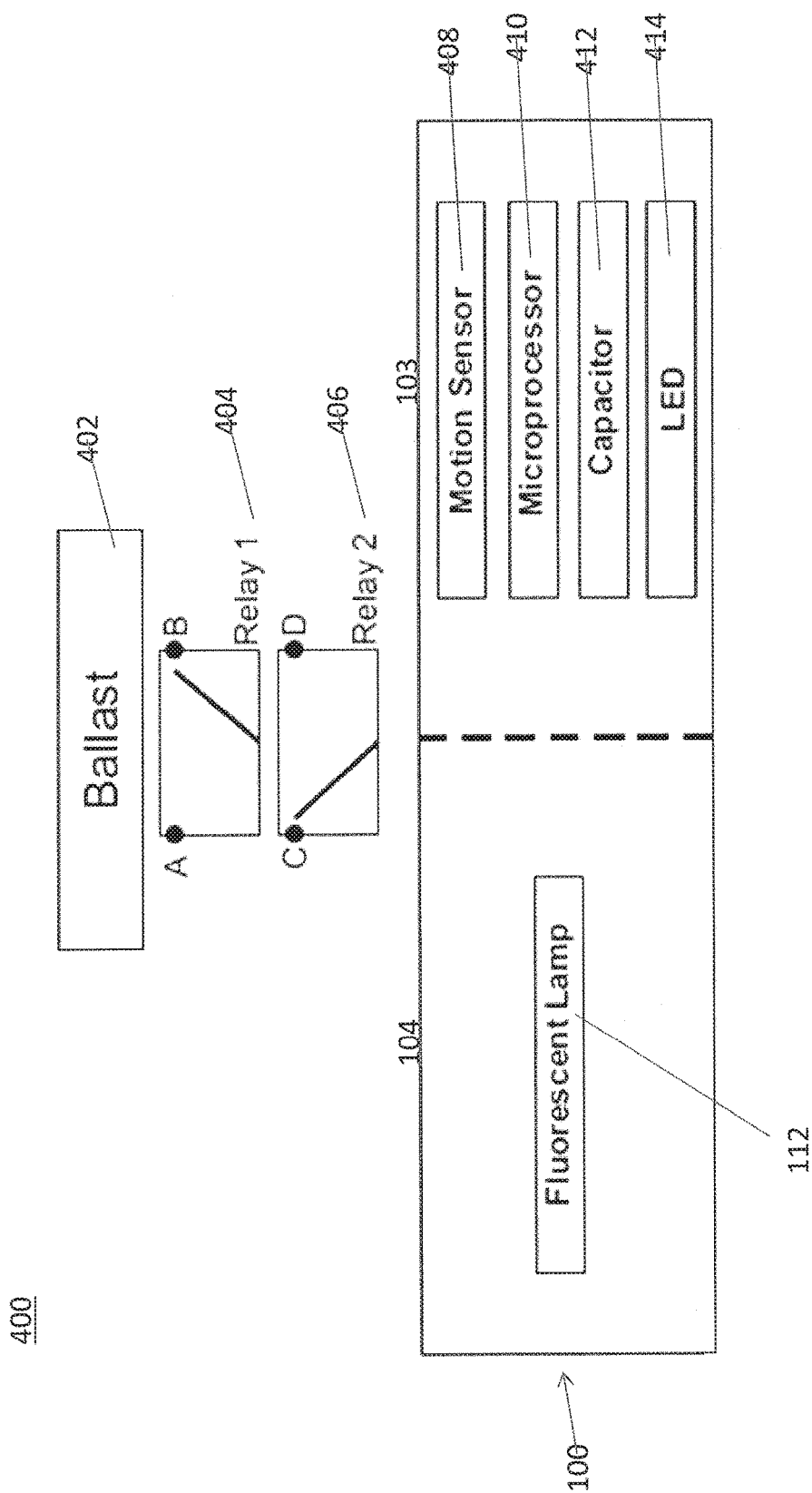
FIG. 7 illustrates a subsequent configuration of the electrical system of the lighting device.

FIG. 7 illustrates a subsequent configuration of the electrical system 400 in accordance with some implementations of the current subject matter. This configuration can characterize the fourth step. If no other motion is detected after a period time (for example 15 minutes or 900 seconds, or any other time period described herein), the microprocessor 410 can send a signal to relay 404 to switch to position B and can concurrently send a command to the relay 406 to switch to position C. Such switching can provide power to segment 103, thereby turning on the one or more LEDs 414.

Thus, the failure mode for the lighting device 100 can be for the fluorescent lamp 309 to remain activated (that is, on).

Figure 8:
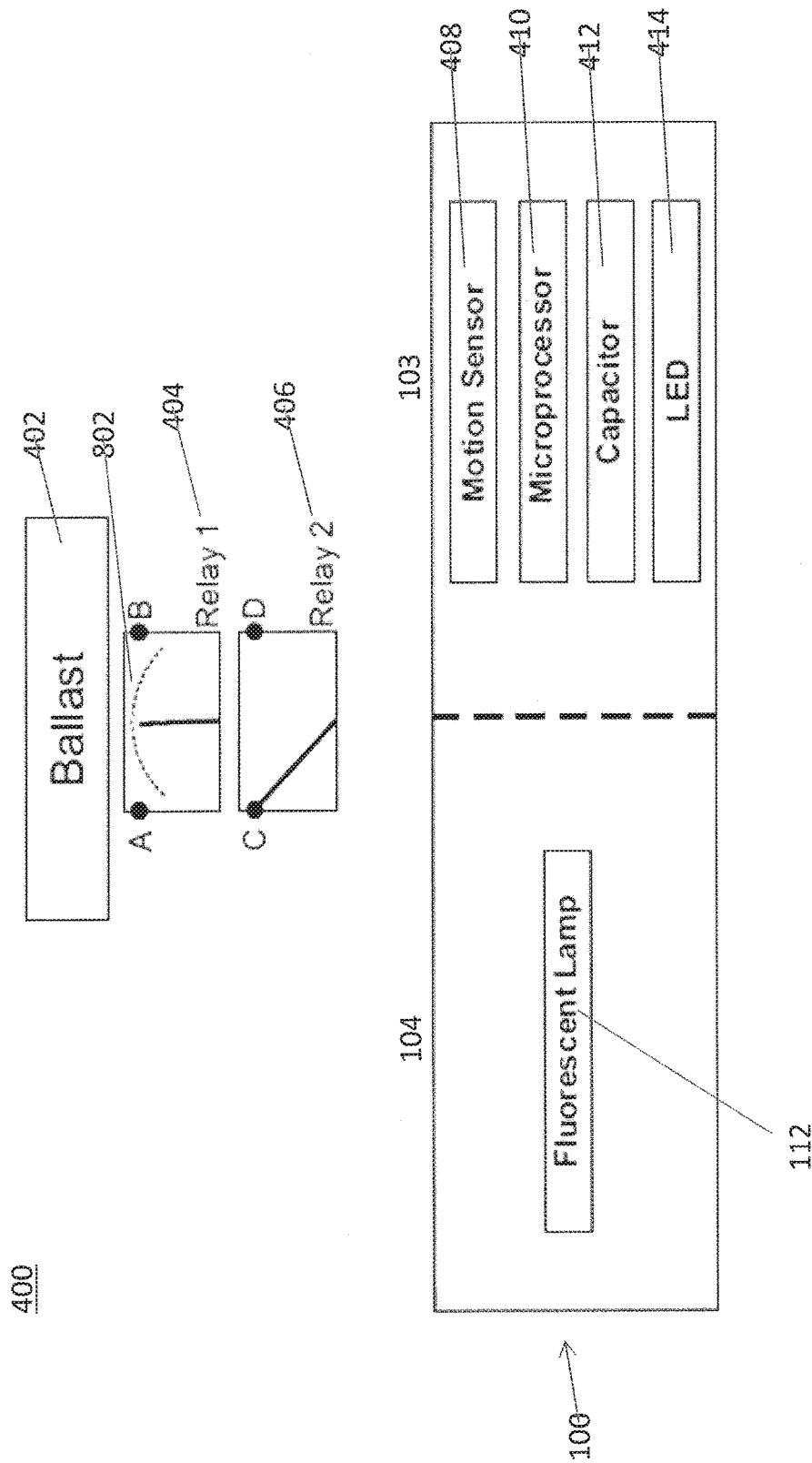
FIG. 8 illustrates a subsequent configuration of the electrical system of the lighting device.

FIG. 8 illustrates a subsequent configuration of the electrical system 400 in accordance with some implementations of the current subject matter. This configuration can characterize the fifth step, as in accordance with some implementations of the current subject matter. This configuration of Relay 1 404 can be a quasi step 802. As noted above with respect to some aspects, no modification can be made to the ballast or the fixture. However, to repower the fluorescent lamp 112, power from the ballast 402 may be interrupted (not drawn upon) and then immediately thereafter power may be drawn from the ballast 402. To make sure there is continuous power to section 103 while the relay 404 is transitioning, a power source, such as capacitor 412 (or any other power source, such as a battery) can be used to power section 103 or just microprocessor 410. The lighting device 100 can function in between the first step and the second step. This functioning in between the first step and the second step can characterize a quasi step 802, which can be the fifth step. In the quasi step 802, the relay 404 can be in a transition from position A to position B.

While in most implementations, the lighting device 100 can be a single packaged structure that cannot be separated (that is, separated apart) into separate structures; in some implementations, the lighting device 100 can be separated apart into separate structures so as to possibly replace at least one of the separated-apart structure. For example, the fluorescent lighting source 112 can be replaced with a newer fluorescent lighting source while the LEDs 414 are maintained (that is, not replaced).

In implementations where the lighting device can be separated apart, when the fluorescent lighting source 112 becomes fused (that is, stops working), the fluorescent lighting source 112 can be replaced. When replacing in conventional implementations, the power to the ballast can be turned off. In some other conventional implementations, the power to multiple ballasts can be turned off, which can cause an unsafe environment during those times of change. However, implementations of the segment 103 can include one or more capacitors 412 that can provide power when the main power source may be turned off temporarily. The power provided by the one or more capacitors 412 can keep the LEDs 414 activated while the fluorescent lighting source 112 is being replaced, the power by the capacitors 412 being advantageously provided even in the absence of power from the ballast 402. While one or more capacitors 412 are described as providing power, for a temporary time period, in other implementations, other power sources can also be implemented within the segment 103, wherein these power sources can include micro power sources, nano power sources, and/or any other power sources.

In some implementations, the lighting device 100 can optionally include one or more occupancy detectors. The occupancy detectors can detect the number of passengers in a parking lot, a staircase, or the like structure where the lighting device 100 is implemented. Based on the number of passengers as well, the interchange between the activation of the LEDs 414 and the fluorescent lighting source 112 can be determined. For example, when there are a certain number of people in the structure (that is, the structure is occupied by having people equal to or more than a predetermined threshold value, such as for example, 3 or more people, 5 or more people, 10 or more people, or the like) irrespective of whether the motion sensor has detected motion, the fluorescent lighting source 112 can be activated. Similarly, when the number of people is less than the predetermined threshold value, the LEDs 414 can be activated. Although the occupancy detector is described as being implemented within the lighting device 100, in some other implementations, the occupancy detector can be implemented external to the lighting device 100 such that a single occupancy detector can be used for operating multiple lighting devices 100. In some examples, a single occupancy detector can be used to operate significantly more than one, such as 10, 100, 1000, 10000, or the like.

The occupancy detectors can detect occupancy of a structure, such as a building. The occupancy can be detected using radio-frequency identification (RFID) detectors. The RFID detectors can be implemented on electronic chips inserted on tokens/badges provided to all visitors in the structure. Thus, occupancy can be detected even when motion is not detected, and when the occupants are still (that is, not moving or moving insignificantly—for example, when the occupants may be attending a meeting, listening to a speaker, and/or the like).

In some implementations, the lighting device 100 can optionally include a timer and/or a daylight sensor. For example, the timer and/or the daylight sensor can be implemented to determine one or more predetermined periods of time (for example, night time between 6 pm and 7 am)

during a day when the fluorescent lighting source 112 of the lighting device 100 is to be used. For example, in some structures, between 7 am and 6 pm, light provided by the fluorescent lighting source 112 may not be required as there can be sufficient sunlight. So, between 7 am and 6 pm, only the LEDs 414 can stay active while the fluorescent lighting source 112 can remain inactive. Between 6 pm and 7 am, the fluorescent lighting source 112 can also activate based on detections by the motion sensor and/or the occupancy sensor. While use of night being from 6 pm to 7 am and day from 7 am to 6 pm is used as an example herein, night and day can be represented by the actual sun rise and sun down which can be calculated based on the location of the lighting device 100 relative to the equator and determined by the microprocessor using known sun rise/sun down calculations. Alternatively, set times such as 5 pm, 6 pm, 7 pm, 8 pm or the like can be used for the start of night and 5 am, 6 am, 7 am, 8 am or the like can be used for the start of day.

In some implementations, activation and inactivation of the LEDs 414 and the fluorescent lighting source 112 can be controlled manually by using switches for the corresponding one or more lighting devices 100. In some examples, the switch can be usable only by selected entities and/or individuals, such as a control room, an office administrator, a manager, and/or the like. Thus, the selected entities and/or individuals can allow fluorescent lighting sources 112 of some lighting devices 100 (for example, lighting devices in selected geographical areas within the structure, such as a north location, south location, and/or the like) to be activated based on detection by sensors while disallowing fluorescent lighting sources 112 of other lighting devices 100 to be activated.

Figure 9:
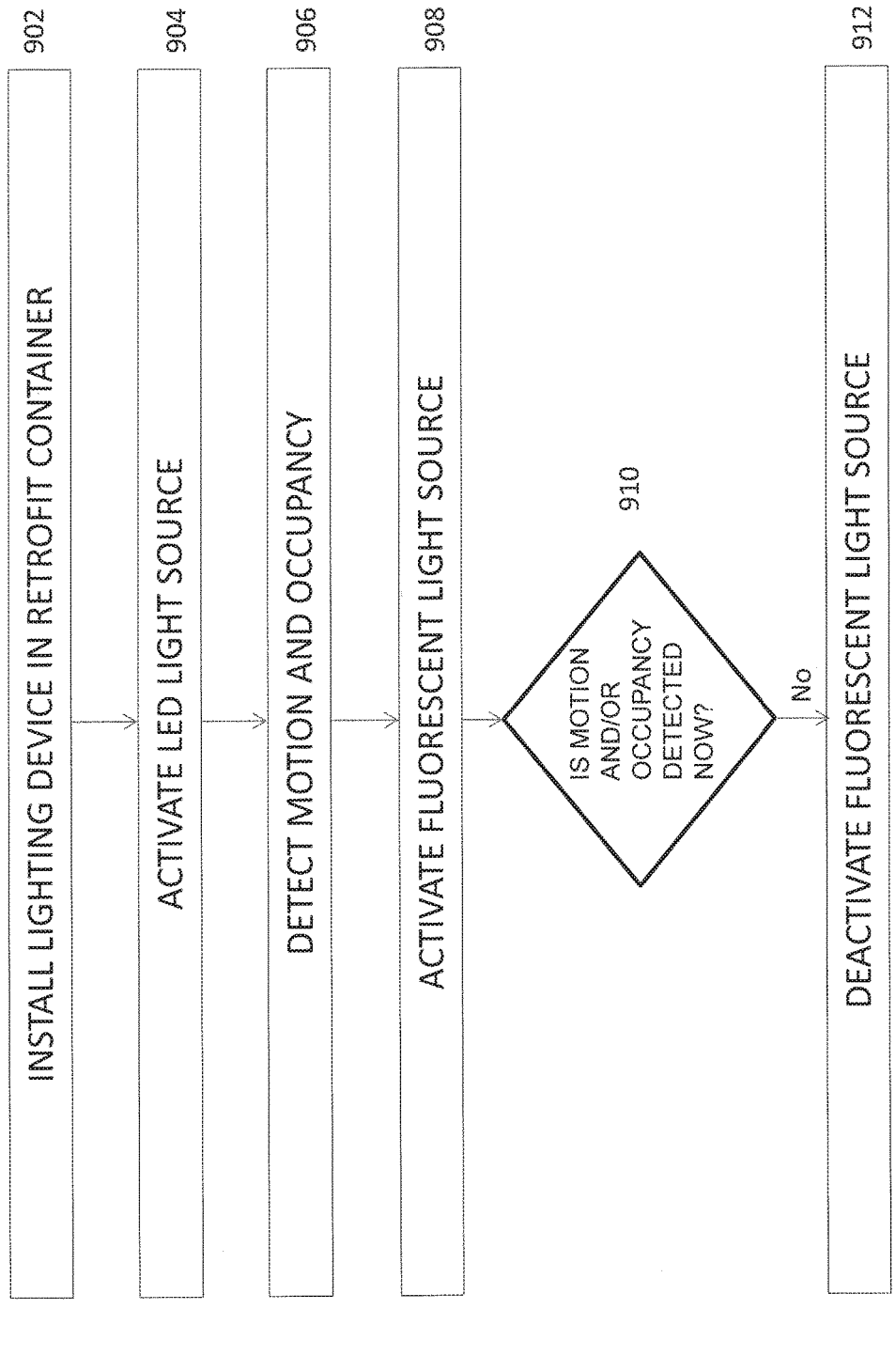
FIG. 9 is a process-flow diagram illustrating aspects of a method consistent with some implementations.

FIG. 9 is a process-flow diagram 900 illustrating aspects of a method consistent with some implementations of the current subject matter. The lighting device 100 can be installed, at 902, in an already existing container/fixture in a structure, such as a parking structure, stairwell, building, and the like. The lighting device 100 can include a LED lighting segment 102 and a fluorescent lighting segment 104. The LED lighting segment 102 can include a LED lighting source 102, and the fluorescent lighting segment 104 can include a fluorescent lighting source 112. The LED lighting source 102 can be activated at 904. One or more motion sensors and/or one or more occupancy sensors can detect, at 906, motion and/or occupancy, respectively, of an occupant in the structure. If there is motion and/or if the occupancy is more than a predetermined threshold, the fluorescent lighting source 112 can be activated at 908. The LED lighting source 102 can be optionally deactivated or optionally remain active. After each regular interval (for example, a predetermined interval of 0.1 seconds, 0.5 seconds, 1 second, 2 seconds, 5 seconds, or the like) of time, which may be decided by an administrative/service personnel, the detection of motion and/or occupancy can be re-performed, at 910, by the one or more sensors. If there is no detection by the one or more sensors during the interval, the fluorescent lighting source 112 can be deactivated at 912. If the LED lighting source 102 was optionally deactivated earlier, the LED lighting source 102 can be activated concurrently with the deactivation of the fluorescent lighting source 112.

Figure 10:
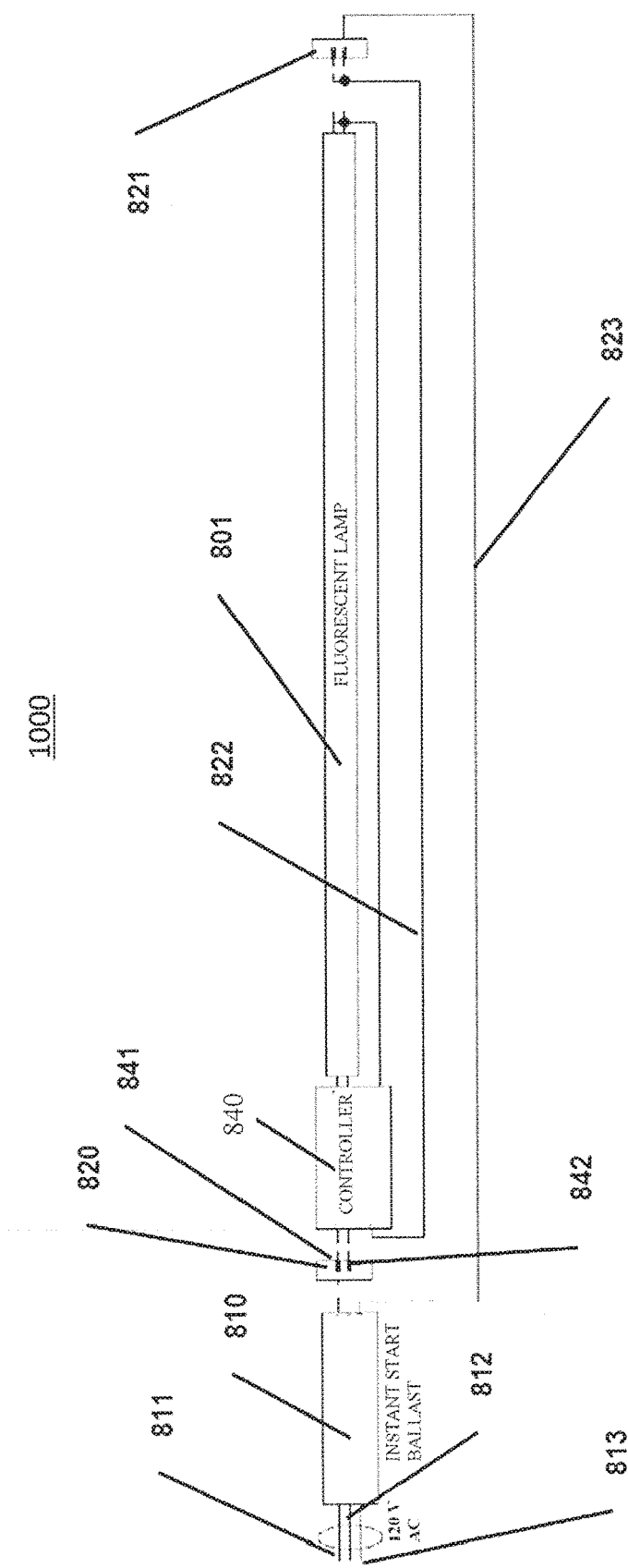
FIG. 10 illustrates electrical wiring of a portion of the lighting device.

FIG. 10 illustrates electrical wiring of a portion of lighting device 1000 in accordance with some implementations of the current subject matter. The lighting device 1000 can include a fluorescent lighting segment and a LED lighting segment. The fluorescent lighting segment can include a fluorescent lamp 801. In the operation of the fluorescent lamp 801, instant electronic ballast 810 can receive AC power by input leads 811, 812 and 813. In igniting the fluorescent lamp 801, the ballast can output electric power, such as 700 Volts AC at high frequency (for example, 10 s of KHz), which can be the mathematical product of 700 and the root mean square voltage (VRMS) of alternating current (AC)). In maintaining/sustaining the fluorescent lamp 102, the ballast can output a 120 Volts AC at high frequency (for example, 10 s of KHz), which can be the mathematical product of 120 and the root mean square voltage (VRMS) of alternating current (AC) at a high frequency such as ten KHz. Electric leads 822 and 823 can lead into sockets 820 and 821. Electric leads 841 and 842 can input power into the controller component 840 of the lighting device 1000.

Thus, to operate the fluorescent lighting segment, instant electronic ballast can receive alternating current (AC) power by input electrical leads. The ballast can output electric power by electric leads to sockets. Electric leads can input power into the controller board, which can be connected with sockets via corresponding two leads/pins. Controller board can be a power board that includes a microcontroller, transformers, resistors, capicitors, step down transformers, relays, and other electrical components.

Figure 11:
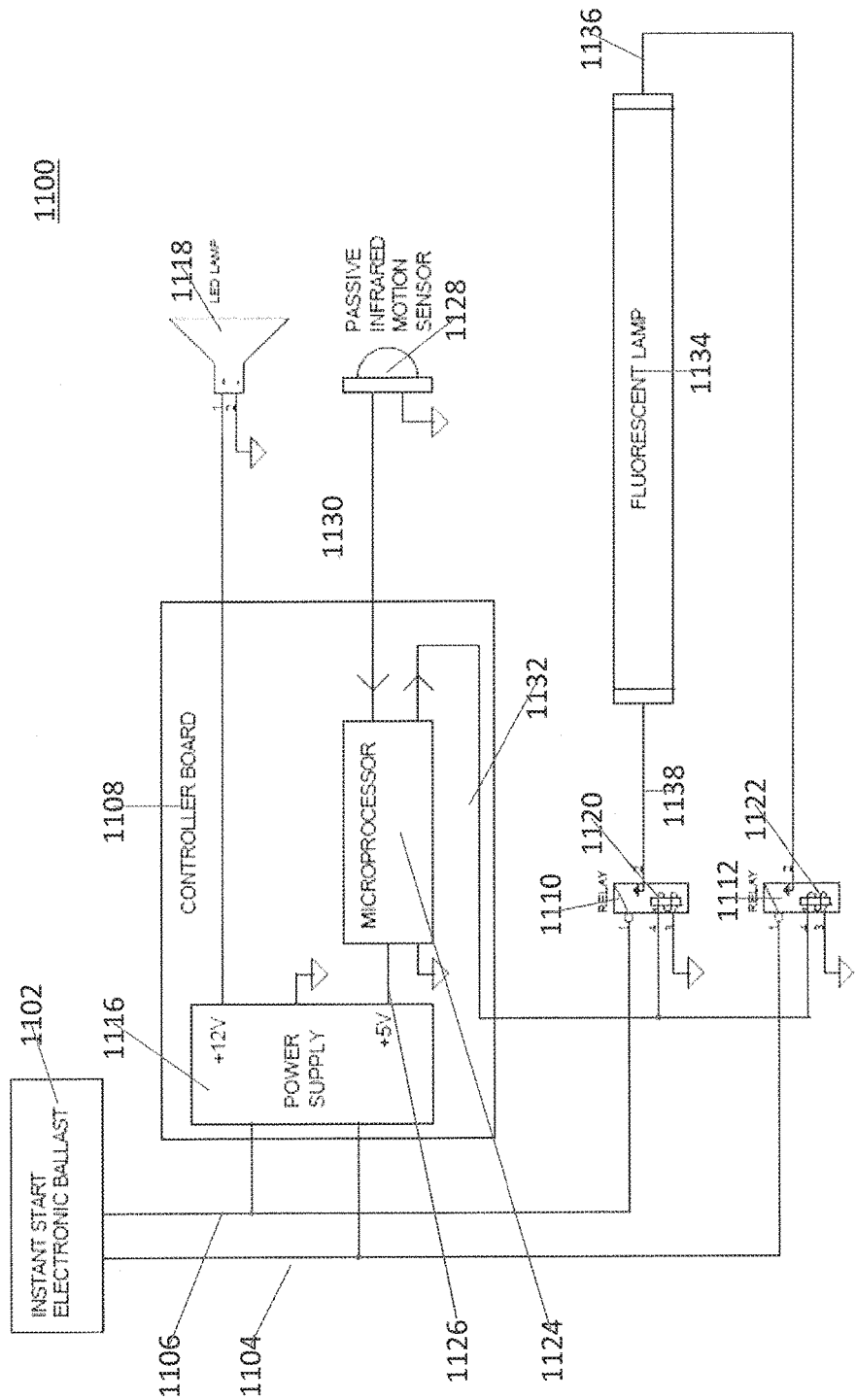
FIG. 11 illustrates another variation of the electrical system of the lighting device.

FIG. 11 illustrates another variation 1100 of the electrical system 400 of the lighting device in accordance with some implementations of the current subject matter. The electrical system 1100 can include a ballast 1102 (or the ballast 1102 could be provided by an existing fixture), electric leads 1104 and 1106, controller board 1108, relays 1110 and 1112, transformer 1114, power supply 1116, LEDs 1118, relay coils 1120 and 1122 of the relays 1110 and 1112, microprocessor 1124, electric lead 1126, detector/sensor 1128, communication line 1130, communication line 1132, fluorescent lighting source 1134, and electrical leads 1136 and 1138.

High VAC and high frequency output power can be provided by a ballast 1102 via electric leads 1104 and 1106 to a controller board 1108 and to relays 1110 and 1112. The relays 1110 and 1112 can be single-pole-single-throw (SPST) high voltage reed relays. In another implementation, the relays 1110 and 1112 can be double-pole-single-throw (DPST) high voltage reed relays. This high VAC can be converted to twelve volts of direct current (DC) by a transformer 1114 associated with the controller board 1108. The converted direct current of twelve volts can be supplied by the power supply 1116 to LEDs 1118. In this implementation, the LEDs 1118 can always stay activated. However, in some other implementations, the LEDs 1118 can be activated and inactivated in a switching manner by using a metal-oxide-semiconductor field-effect transistor (MOSFET). The twelve volts direct current (DC) can also power the relay coils 1120 and 1122 of the relays 1110 and 1112. The twelve volts direct current can be reduced to five volts direct current by a linear voltage regulator (not shown) associated with the power supply 1116. The five volts of direct current can be provided to the microprocessor 1124 by electric lead 1126. The microprocessor 1124 can be in electrical communication with a detector/sensor 1128 via communication line 1130. The sensor 1128 can be a passive infrared motion sensor. Although the sensor 1128 is described to be a motion sensor, in some other implementations, any other sensor can be used, as noted herein. The passive infrared motion sensor 1128 can operate at five volts of direct current. Communication line 1132 can relay the communication from sensor 1128 to relays 1110 and 1112. The relays 1110 and 1112 can connect and disconnect the power from instant start ballast 1102 to the fluorescent lighting source 1134.

FIG. 12 illustrates in more detail relays 1110 and 1112 of FIG. 11, in accordance with some implementations of the current subject matter. Electric lead 1106 can provide a high voltage and associated high frequency power to relay 1110 while the relay 1110 can be closed and the LEDs 1118 can be active. Similarly, electric lead 1104 can provide a high voltage and associated high frequency power to relay 1112 while the relay 1112 can be closed and the LEDs 1118 can be active. After the microprocessor 1124 receives a signal from the passive infrared motion sensor 1128, the microprocessor 1124 can send a signal to relays 1110 and 1112 via communication lead 1132. Communication lead 1132 can also provide twelve volts of direct current power to the coils 1120 and 1122 of the relays 1110 and 1112. The closed relays 1110 and 1112 can be opened and high voltage and high frequency alternating current power can be transmitted to the fluorescent lighting source 1134 by electric leads 1136 and 1138 to activate the fluorescent lighting source 1134, which can provide a brighter lighting than the LEDs 1118.

After the microprocessor 1124 receives a signal from the passive infrared motion sensor 1128, the microprocessor 1124 can signal the fluorescent lighting source 1134 to remain active for a predetermined period of time, as described above. The segment including the fluorescent lighting source 1134 can be connected to or disconnected from the instant-on ballast through the relays 1110 and 1112.

Figure 13:
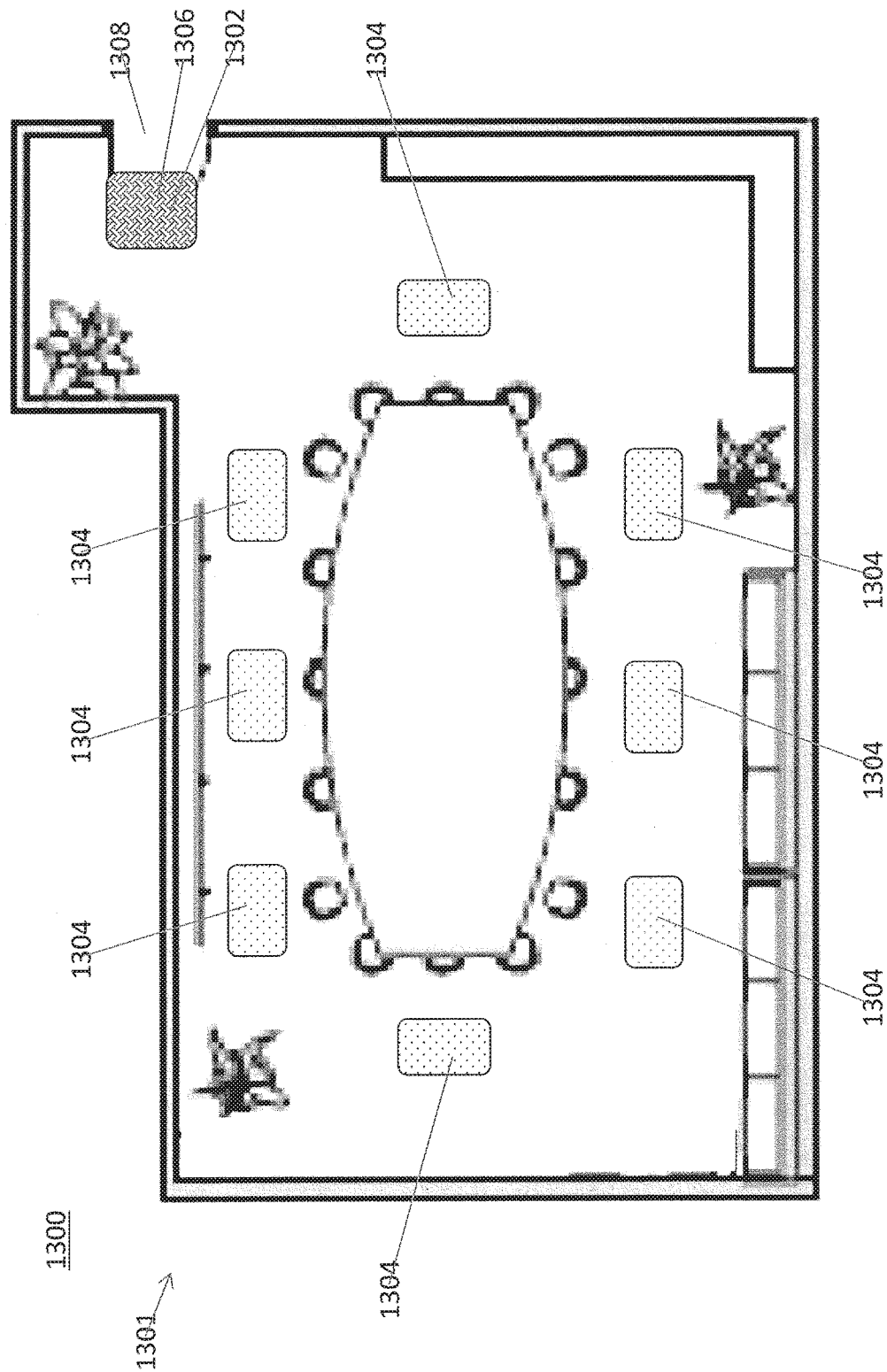
FIG. 13 illustrates a top view of an example networking arrangement of the lighting devices in a conference room.

FIG. 13 illustrates a top view of a networking arrangement 1300 of the lighting devices 100 in a conference room 1301, which can be an example of a structure, in accordance with some implementations of the current subject matter. The networking arrangement 1300 can characterize networking of the lighting devices 100 with each other and with other one or more electrical devices. The lighting devices 100 can be implemented in a master-slave configuration. For example, a first set of lighting devices 100 can be master lighting devices 1302, and a second set of lighting devices 100 can be slave lighting devices 1304. The master lighting devices 1302 can be strategically located above an entrance door 1306 of the conference room 1301 or above the doorway 1308 leading to the entrance door 1306. The slave lighting devices 1304 can be strategically located at multiple places in the conference room 1301.

In some implementations, each slave lighting device 1304 can optionally have a single lighting segment (instead of a LED segment and a separate fluorescent lighting segment), and can have a receiver (for example, a short-range receiver) to receive commands from the master lighting devices 1302. Each master lighting device 1304 can have a lower level lighting segment (for example, LED segment) and a higher level lighting segment (for example, fluorescent lighting segment), an occupancy sensor or motion detector, and a transmitter (for example, a short-range transmitter). The lighting source (for example, LED lighting source) associated with the lower level lighting segment can optionally remain active at all times. The motion sensor described above can be used, or alternatively and/or additionally, an occupancy sensor, can be associated with the master lighting device 1302 which can sense motion or occupancy in the conference room 1301, wherein the occupancy can be number of individuals and/or entities (for example, furniture, electronic equipment, and/or the other entities) in the conference room 1301. When motion is detected or the occupancy becomes equal to or more than a predetermined threshold, the lighting source (for example, the fluorescent lighting source) associated with the higher lighting segment can be activated, and instantaneously and concurrently, one or more commands/signals can be sent to the slave lighting devices 1304 so as to become activated.

The one or more commands/signals from the master lighting devices 1302 to slave lighting devices 1304 can be sent either over a wire or wirelessly. The wireless transmission can be via a communication network, such as at least one of a local area network (LAN), a wide area network (WAN), internet, Wi-Fi, Bluetooth network, infrared network, and any other network.

Figure 14:
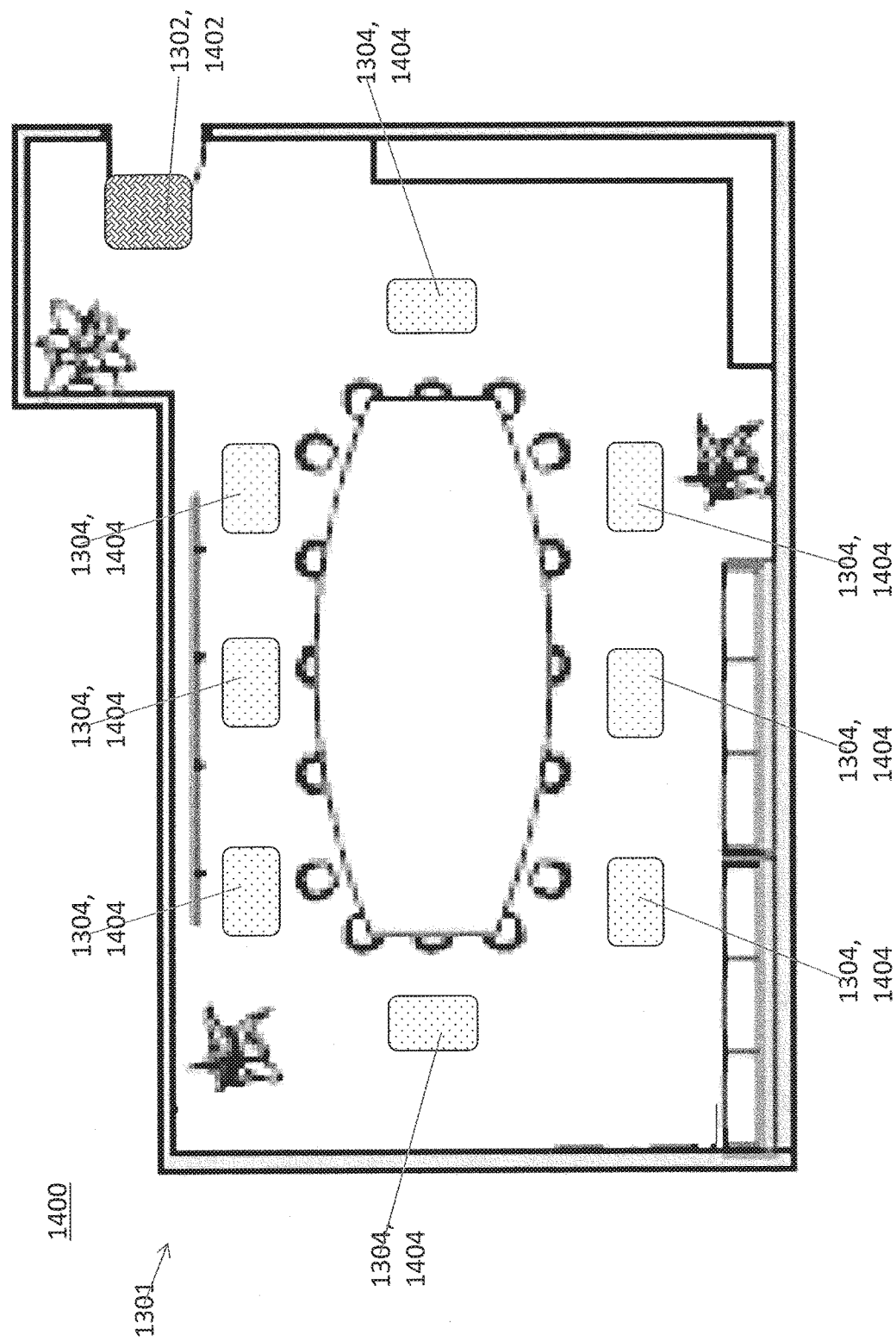
FIG. 14 illustrates a top view of another variation of an example networking arrangement of the lighting devices in a conference room.

FIG. 14 illustrates a top view of another variation 1400 of networking arrangement 1300 of the lighting devices 100 in a conference room 1301, which can be an example of a structure, in accordance with some implementations of the current subject matter. In one example of the networking arrangement 1400, the fixture 1402 that can incorporate the master lighting devices 1302 can hold/incorporate four lighting devices 100. Each of the eight fixtures 1404 that incorporate the slave lighting devices 1304 can hold/incorporate four lighting devices, which can be either lighting devices 100 or lighting devices with a single segment. In one implementation, these thirty-six (that is, product of nine and four) lighting devices can be controlled by a zone lighting control. With the zone lighting control, all (or most of) the thirty-six lighting devices can be activated, deactivated, dimmed, or brightened at a same time, thereby saving energy.

In some implementations, the control of the master lighting devices 1302 and the slave lighting devices 1304 can be provided from a central location, such as the web portal that can be used by facility/service/administrative personnel. The web portal can be provided on a graphic user interface or a display device associated with at least one data/programmable processor. The web portal can be implemented on a terminal device used by a user, such as a desktop computer, a laptop, a tablet computer (for example, IPAD), a mobile phone (for example, smart phone), and any other such device. To provide the control from the central location, a network can be formed, as noted herein. The web portal can control the network by allowing a user to program the control mechanism of the network. The lighting devices 100 within the master fixture 1402 can include communication components that facilitate communication between the master lighting devices 1302 and the slave lighting devices 1304. Such communication components can include a gateway, a router, and/or other communication devices. The gateway can include one or more of protocol translators, impedance matching devices, rate converters, fault isolators, and signal translators, as necessary to provide system interoperability. One lighting device 100 from the master lighting devices 1302 can have an address identifying location, host, and/or location interface, such as an internet protocol (IP) address. This internet protocol address can allow an isolation/separation of this one lighting device 100 from other, for example, thirty-five (36−1=35) lighting devices 100. Here, the other thirty-five lighting devices 100 can act as a slave to the one lighting device 100, wherein the slaves can receive commands from the master for activation, inactivation, dimming, brightening, changing color, and/or the like. These thirty-five slave lighting devices 100 can receive wireless communication commands from the one master lighting device 100, thereby establishing a zone lighting environment without any modifications to already existing fixtures 1402 and 1404.

The communication between the central location, such as the web portal, and the master lighting device 100 can be performed using long-range communication and protocols, which can be either wired or wireless, such as Wi-Fi. The communication between the master lighting device 100 and the slave lighting devices 100 can be performed using short-range communication and protocols, which can be either wired or wireless, such as Bluetooth.

Figure 15:
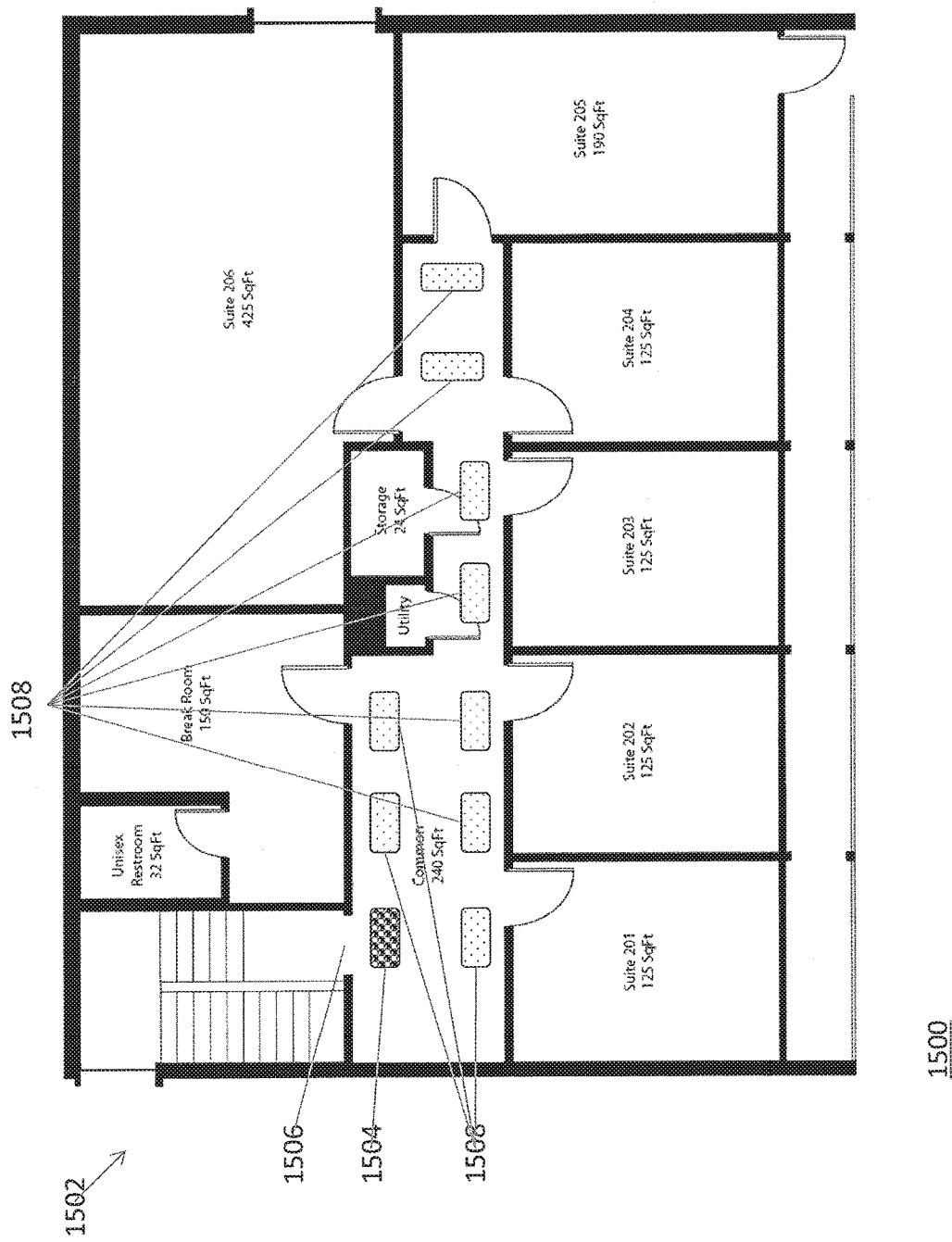
FIG. 15 illustrates an example floor plan of a medical office, which can be an example of a structure.

FIG. 15 illustrates a floor plan 1500 of a medical office 1502, which can be an example of a structure, in accordance with some implementations of the current subject matter. The one or more master lighting devices 1504 can be placed above an entrance door 1506 or path. The one or more master lighting devices 1504 can communicate with slave lighting devices 1508 such that a master-slave configuration can be formed. In one example of such a communication, detection, by the one or more master lighting devices 1504, of motion and/or occupancy of more than a predetermined threshold can activate all or selected one or more of the slave lighting devices 1508 instantaneously and/or simultaneously.

Figure 16:
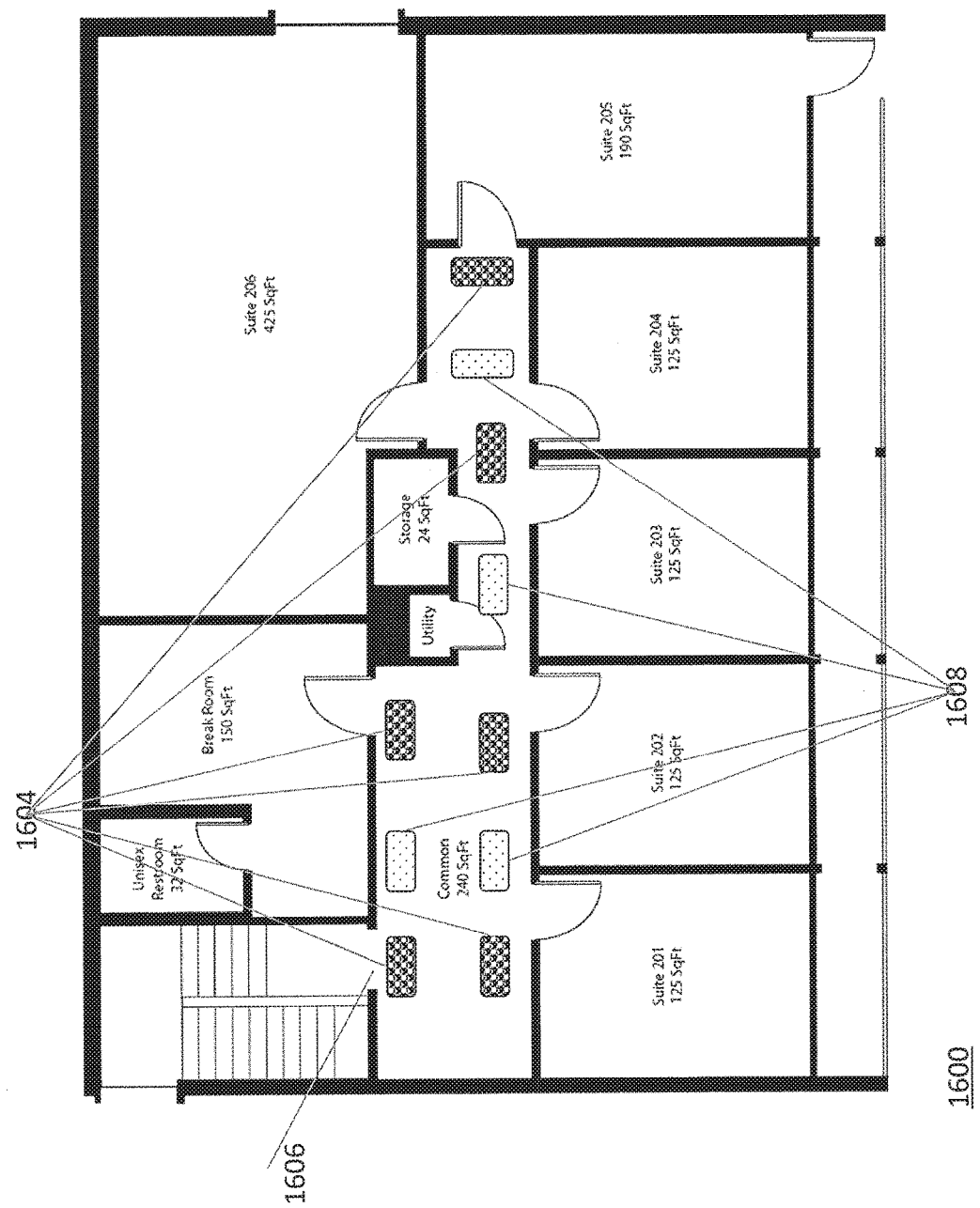
FIG. 16 illustrates an example floor plan of a medical office.

FIG. 16 illustrates a floor plan 1600 of a medical office 1602, which can be an example of a structure, in accordance with some implementations of the current subject matter. The master lighting devices 1604 can be placed at multiple places, as shown. More specifically, the master lighting devices 1604 can be placed above an entrance door 1606 or path, and above an entrance door or path of each or most of the rooms. The one or more master lighting devices 1604 can communicate with slave lighting devices 1608 such that a master-slave configuration can be formed. In one example of such a communication, detection, by the one or more master lighting devices 1604, of motion and/or occupancy of more than a predetermined threshold can activate all or selected one or more of the slave lighting devices 1608 instantaneously and/or simultaneously.

Figure 17:
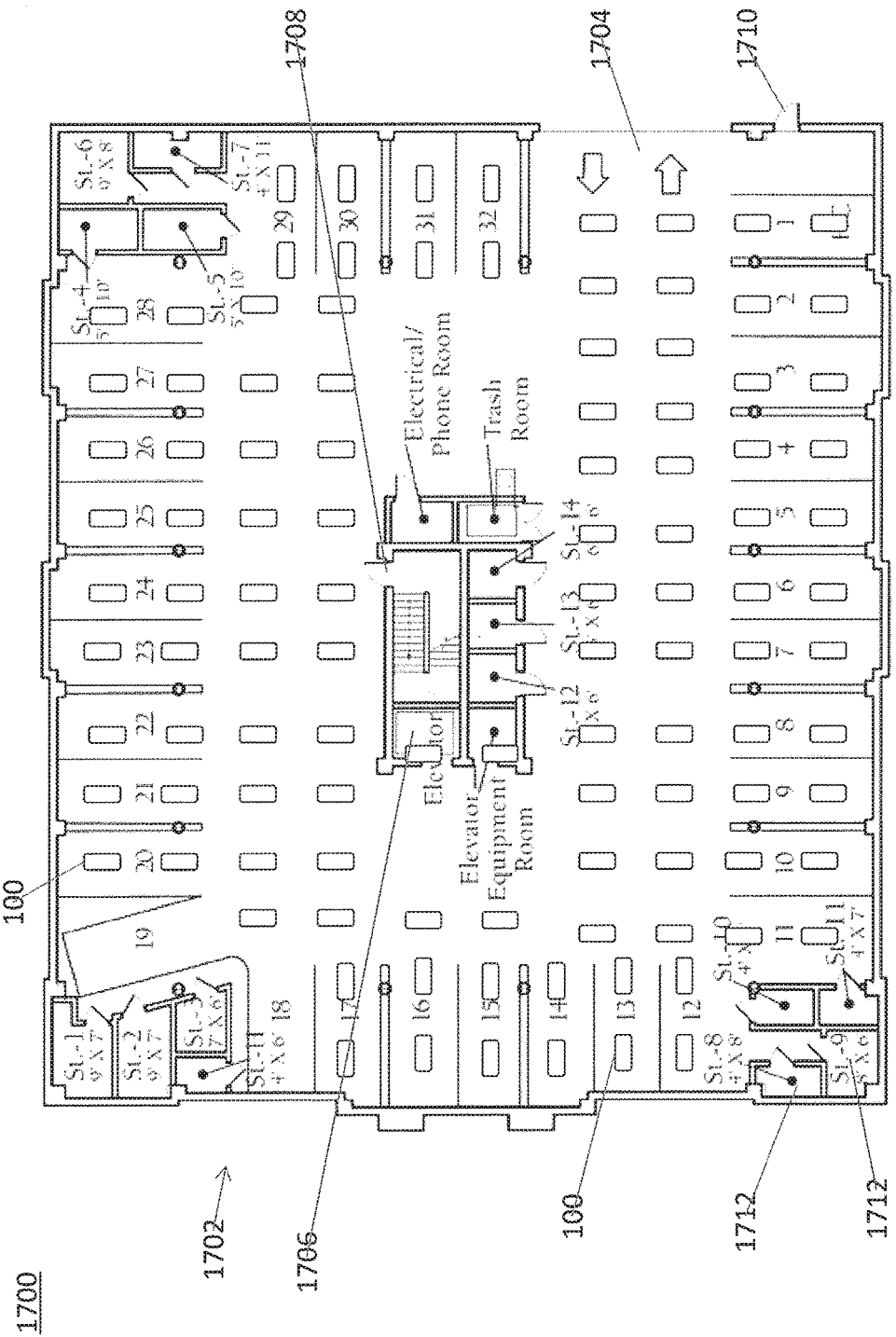
FIG. 17 illustrates an example floor plan of a covered parking structure, which can be an example of a structure.

FIG. 17 illustrates a floor plan 1700 of a covered (for example, underground) parking structure 1702, which can be an example of a structure, in accordance with some implementations of the current subject matter. The lighting devices 100 implemented in the parking structure 1702 can communicate with each other. The lighting devices 100 can be installed in parking slots and in some/all common areas. When an entity/occupant (for example, a person, a vehicle, or the like) enters the parking structure 1702 at location 1704 that can be an entrance to the parking structure, a person exits an elevator at location 1706, a person steps into the parking structure 1702 from a stairwell 1708, a person steps into the parking structure 1702 from a doorway 1710, or a person works in storage areas 1712, fluorescent lighting sources 112 incorporated within all (or selected areas, wherein the selection can be based on geographical area of entity's presence within the parking structure 1702) of the lighting devices 100 can activate, and the LED lighting sources 102 within the segment 103 can optionally inactivate, thereby providing a higher level of lighting so as to provide safety and security within the parking structure 1702. The fluorescent lighting source 112 can remain activated for predetermined period of time (as noted above), which can be determined using a timer that can be implemented either within the lighting device 100 or external to the lighting device. In some implementations, there can be a single timer for different lighting devices 100, in which the lighting sources can activate and inactivate concurrently.

For communication between most elements in the parking structure 1702, long-range components and protocols, such as those associated with Wi-Fi communication, can be used. While a use of long-range communication is described, short-range communication and protocols, such as those associated with Bluetooth, can be used when elements are within a corresponding short range, such as the Bluetooth range. Mesh networking type of networking can be used so as to ensure that communication can be maintained even when one or more lighting devices 100 may become inoperational and may need to be replaced. The mesh networking can be established using ZIGBEE or ZIGWAVE devices and protocols.

FIG. 18 illustrates standards 1802, wireless technologies 1804, and wired technologies 1806 that can be used herein, as in accordance with some implementations of the current subject matter.

Figure 19:
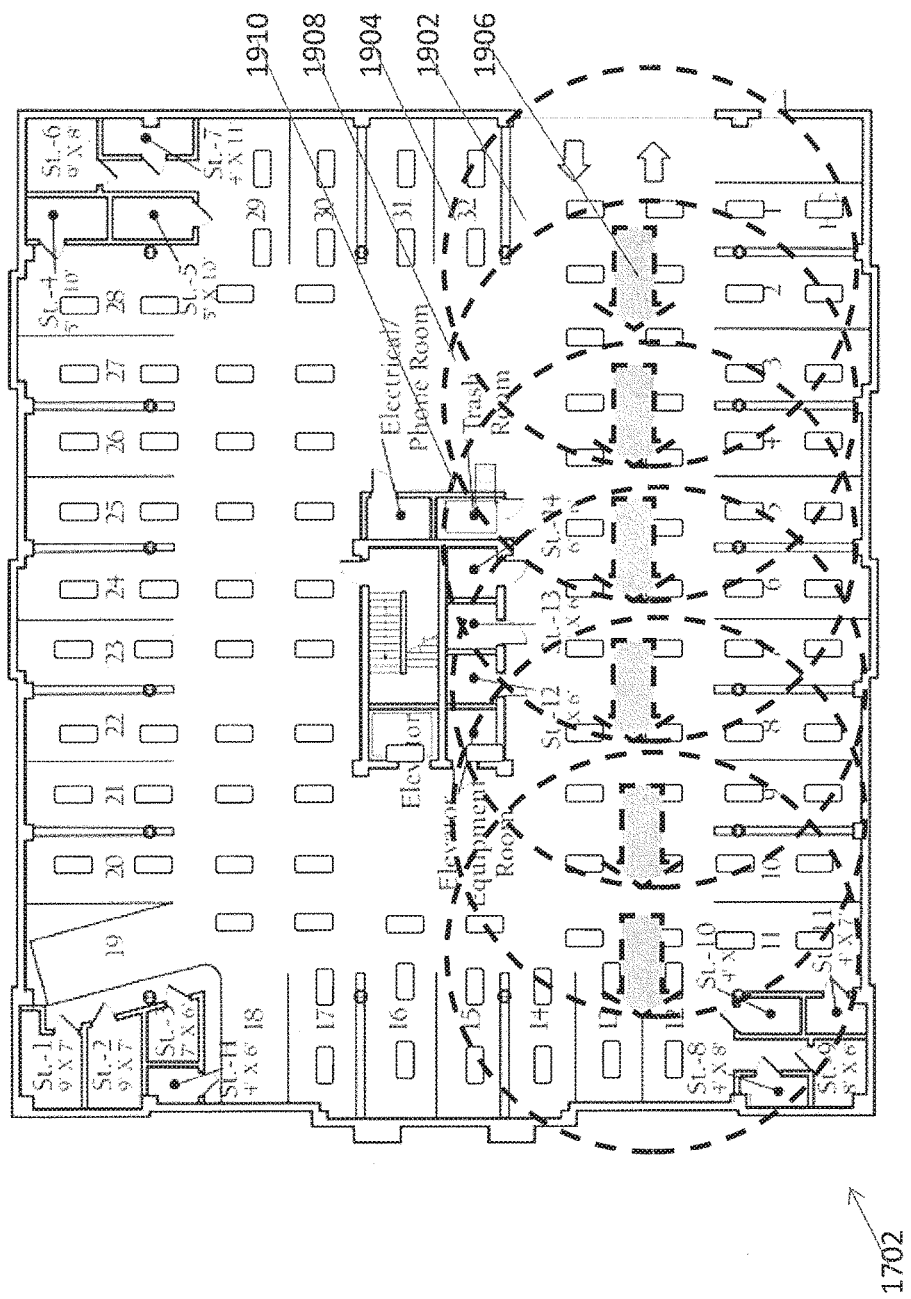
FIG. 19 illustrates a variation of example networking with respect to the floor plan of the covered parking structure.

FIG. 19 illustrates a variation of networking with respect to the floor plan 1700 of the covered (for example, underground) parking structure 1702 in accordance with some implementations of the current subject matter. Even more optimization of energy while ensuring safety is possible by allowing communication between various lighting devices 100 in a progressive manner, as described below.

When an entity/person enters location 1902, fluorescent lighting sources 112 incorporated in lighting devices 100 within a circle 1904, center of which can be at location 1902 and which can have a predetermined radius (for example, 5 meters, 10 meters, 20 meters, and the like), can be activated so as to provide brighter lighting than brightness of light provided before the activation. The fluorescent light by the fluorescent lighting source 112 within the lighting device 100 can refer to a higher lighting level of brightness, and light by the one or more LEDs 102 within the lighting device 100 can refer to the lower lighting level of brightness. As the entity moves or travels along the direction shown by arrows 1906, the previously activated lighting devices 100 within the circle 1904 can remain at the higher brightness level, while the lighting devices 100 within circle 1908 are activated to a higher brightness level. Similarly, as the entity continues along the direction of the arrows 1906, the lighting devices within circles 1904 and 1906 can remain at the higher brightness level, while the lighting devices 100 within the circle 1910 can be activated to a higher brightness level, and so on.

While circles 1904, 1908, and 1910 have been shown to characterize progressive areas, in some other implementations, other shapes can also characterize progressive areas, such as squares, rectangles, ellipses, triangles, hexagons, polygons, and/or the like. Such shapes can be used individually or in combination. As per some examples where different shapes are used in combination, different shapes can be used for different areas in the parking structure 1702 based on the area size and construction. The dimensions of each shaped area can also vary based on the area size and construction. Further, while each progressive area is shown to form a fixed area (for example, each circle is shown to have a fixed radius and area), in some other implementations, varying areas can be used. The areas of different progressive areas can vary based on one or more of the following factors: number of occupants moving in the parking structure 1702, type (for example, person or vehicle) of the entity moving in the parking structure 1702, speed of the entities moving in the parking structure 1702, and preferences of a manager managing the lighting of the parking structure 1702.

In this manner, the entity can be advantageously secure and safe in an area of high brightness level while the energy used is optimized. The brightness level of each lighting device 100 can revert back to the lower level of brightness (that is, the fluorescent lighting source within the lighting device 100 can be inactivated, and if the LEDs were inactivated during the higher level of brightness, the LEDs can be reactivated) after a predetermined time (as described herein) may have elapsed since the entering of the entity.

The network described herein can include connections between lighting devices 100 and other devices, such as heating controls, cooling controls, heating ventilation and air conditioning (HVAC) systems, photosensitive windows, electro-sensitive windows, alarms, coffee maker, toaster, and/or any other electrical/electronic device. When a master-slave configuration is formed in the network, one lighting device 100 can be a master device, while the other lighting devices 100 and one or more of the above-mentioned other devices can be slave devices. For example, when the master lighting device 100 sends a signal to an above-mentioned other device such as the photosensitive window, an action can be performed such as one of opening and closing of the photosensitive window. Other examples of action can be either activation or deactivation of one or more heating ventilation and air conditioning (HVAC) systems, electro-sensitive windows, and alarms.

Figure 20:
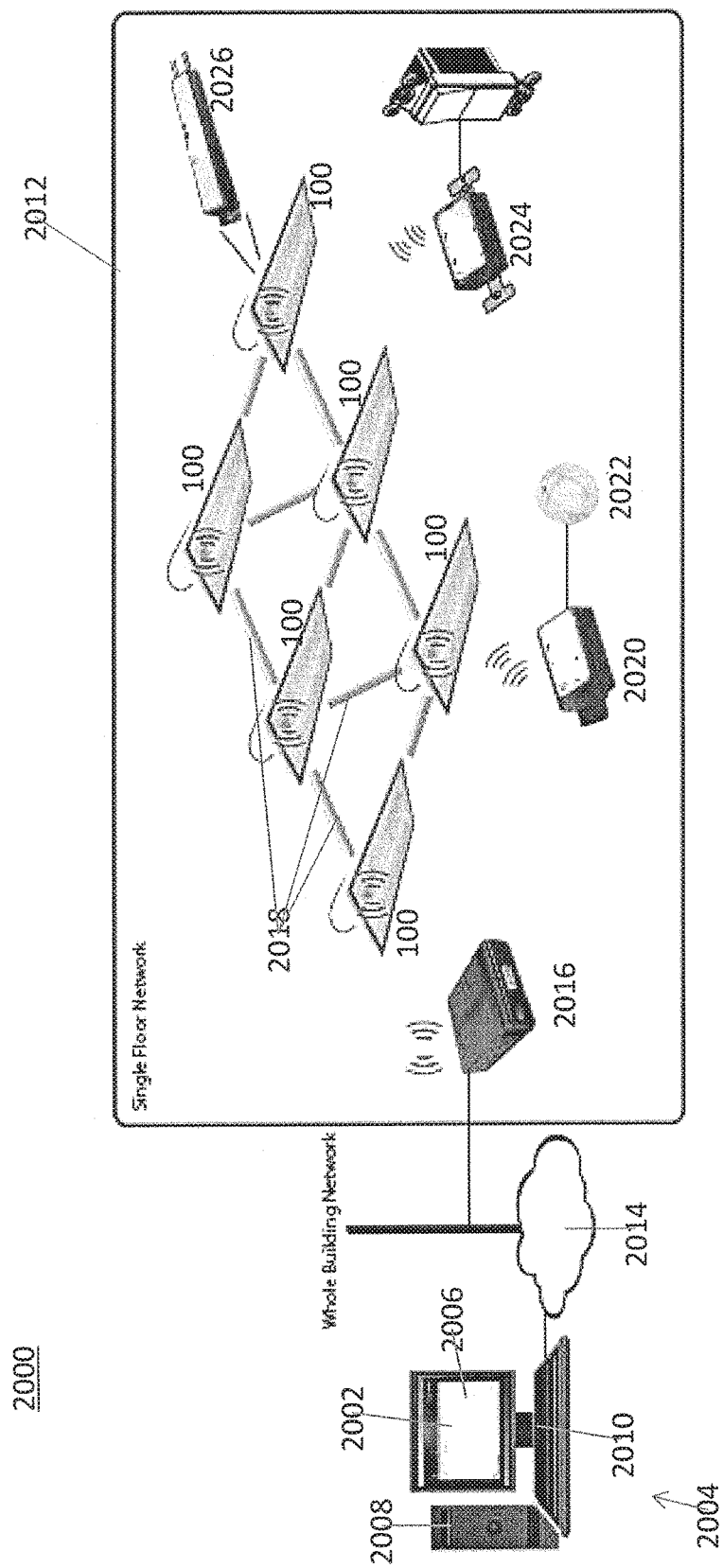
FIG. 20 illustrates an example wireless networking arrangement that can include communication between lighting devices and other communication devices.

FIG. 20 illustrates a wireless networking arrangement 2000 that can include communication between lighting devices 100 and other communication devices, as in accordance with some implementations of the current subject matter. A web portal 2002 can be managed by administrative/service/staff personnel from a central location, such as a remote office. The web portal 2002 can be implemented on a computer 2004. The computer 2004 can include at least a graphic user interface or display device 2006, a processor 2008 (for example, central processing unit), a memory, a keyboard 2010 and/or any other input device, and/or any other component that can be implemented-on/connected-with the computer 2004. The web portal 2002 can connect wirelessly to a network 2012 via a network 2014 and a gateway 2016. The network 2012 can be for a particular floor in a building, or can be for all the floors of the building. In one aspect, the network 2012 can characterize a wireless mesh network 2018, such as a high frequency (for example, 900 MHz, 2.4 GHz, or the like) secure ZIGBEE wireless mesh network. The network 2012 can wirelessly connect various lighting devices 100 with each other and with other communication devices, such as the wireless gateway 2016, a wireless sensor interface 2020, an external sensor 2022 (for example, motion sensor), a wireless wall control interface 2024, and a wireless light controller 2026.

The network 2012 can be the Internet, a local area network, a wide area network, or the like. In some aspects, the computer 2004 implementing the web portal 2002 can be remote to the network 2012 such that short-range communication such as Bluetooth or Infrared may not be possible. While wireless communication is described between the computer 2004 and the network 2012, in some other implementations, the computer 2004 and the network 2012 can be connected using electrical wires. Further, while wireless communication is described within the wireless mesh network 2018, in some other implementation, the lighting devices 100 can be connected by electrical wires.

Some implementations described herein can have two lighting levels—(1) a high lighting level that can correspond to activation of fluorescent lighting source 112 of the lighting device 100, and (ii) a low lighting level that can correspond to activation of the one or more LED lighting sources 102 and inactivation of the fluorescent lighting source 112 of the lighting device 100. The brightness associated with each of the high lighting level and the low lighting level can be varied using a web portal at a central location by an administrative/service personnel. For example, the brightness associated with the high lighting level can be set at 72% of the maximum brightness level, and the brightness associated with the low lighting level can be set at 40% of the maximum brightness level. The brightness levels can be automatically changed based on the season, such as fall, winter, spring, summer, and the like. Further, the brightness levels can be automatically changed at different times of the day. Furthermore, the brightness levels can automatically change based on cost of energy per unit—that is, when energy is cheaper, the levels of brightness can be automatically increased, and when energy is expensive, the levels of brightness can be automatically decreased. In some aspects, weather around the structure can be detected automatically (using a thermometer, weather detector, website, and/or the like), and based on the detected weather, the brightness levels can be varied. In some implementations, one or more lighting devices 100 can have brightness levels different from some other lighting devices 100 within the structure. Further, the brightness levels can be changed, automatically or manually, for selected lighting devices 100 such that different lighting devices 100 can have different brightness levels—for example, different rooms within a structure can have different brightness levels.

While LEDs are described to provide lower lighting brightness levels, in some other implementations, other energy efficient lighting sources can also be used, such as plasma lighting sources, induction lighting sources, magnetic induction lighting sources, and/or the like.

The LEDs noted herein can be white LEDs that can be phosphor-based in any correlated color temperature (CCT) and color rendering index (CRI). In some implementations, LEDs either can be of any color (for example, red, green, blue, orange, yellow, or any other color) or can be white-light LEDs that can be formed by combining red, green and blue colors. The LEDs can use quantom dots to efficiently transform the color of light from one frequency to another. Some LEDs can transmit light associated with ultraviolet (UV) or infrared (IR) frequencies. The LEDs can include organic light emitting diodes (OLEDs). The LEDs can be activated by providing either direct current (DC) or alternating current (AC). The alternating current LEDs can be used in conjunction with power transformers.

In some aspects, one or more of the following can be implemented: the lighting devices 100 can have lengths between two feet and eight feet, the fixtures in which lighting devices 100 are placed/incorporated can have a lifetime of 30 years or more, and the fixtures can incorporate lighting devices 100 with a length of one hundred and twenty centimeters (or forty-eight inches) to fit within the fixture.

Further, some implementations describe that an already existing container/fixture can incorporate a single lighting device 100. Variations are possible, where multiple lighting devices 100 can be incorporated in one fixture, wherein those multiple lighting devices 100 can be connected in a series electrical configuration and/or in a parallel electrical configuration.

Furthermore, some implementations described herein have two lighting levels—(1) a high lighting level that can correspond to activation of fluorescent lighting source 112 of the lighting device 100, and (ii) a low lighting level that can correspond to activation of the one or more LED lighting sources 102 and inactivation of the fluorescent lighting source 112 of the lighting device 100. In some other implementations, both the high lighting level and the low lighting level can correspond to respective segments and lighting sources of lighting diodes. For example, a high lighting level can correspond to activation of a large number of LEDs (for example, fifty or more, sixty or more, seventy or more, or the like), and the low lighting level can correspond to activation of a lower number of LEDs (for example, less than 20, fifteen or less, ten or less, five or less, or the like), while there may not be any fluorescent lighting segment.

As noted herein, a central portal (for example, the web portal) can be used to control the network of lighting devices 100 by administrative/service/staff personnel. The central portal can be implemented on a terminal device used by a user, such as a desktop computer, a laptop, a tablet computer (for example, IPAD), a mobile phone (that is, smart phone), and any other such device. The web portal and related devices can be used to perform various algorithms to perform operations noted herein, including scheduling, daylight harvesting or day-lighting, task tuning to optimize the level and the area of lighting, demand response (e.g., reducing peak energy demand at key times, and being reimbursed by utilities to do so) and manual controlling of the network or of at least one lighting device 100.

While a motion detector and a occupancy detector are generally described herein, other detectors can also or alternately be used as appropriate, such as one or more of the following: ultrasonic occupancy detectors, ultrasonic motion detector, passive infrared (PIR) motion detectors, active infrared (IR) motion detector, dual-technology detectors (i.e., passive infrared and ultrasonic), X-band motion detector, K-band motion detector, C-band motion detector, continuous wave (CW) radar motion detector, vibration motion detector, proximity (radio frequency field) detector, microwave/radar detector, video detector, active infra-red (light beam) detector, visible light beam detector, fish finder, laser beam detector, contact detector, tilt detector, strain/stress detectors, acoustic, sound and vibration detector, geophone detector, hydrophone detector, microphone detector, seismometer detector, curb feeler detector, defect detector, hall effect detector, MAP detector, mass flow detector or mass airflow (MAF) detector, oxygen detector, speed detector, turbine speed sensor (TSS), or input speed sensor (ISS), vehicle speed sensor (VSS), wheel speed detector, chemical and hazardous material detector, carbon dioxide detector, carbon monoxide detector, chemical field-effect transistor, electrochemical gas detector, electrolyte-insulator-semiconductor detector, hydrogen detector, hydrogen sulfide detector, non-dispersive infrared detector, microwave chemistry detector, nitrogen oxide detector, olfactometer detector, oxygen detector, pellistor, potentiometric detector, smoke detector, galvanometer, magnetometer, metal detector, actinometer, dew warning, gas detector hygrometer, pyranometer, pyrgeometer, seismometers, air flow meter, anemometer, flow detector, ionizing radiation and subatomic particles detector, particle detector, vibrating structure, gyroscope, accelerometer, piezoelectric accelerometer, optical, light, imaging and photon detector, colorimeter, electro-optical detector, flame detector, LED as light detector, fiber optic detectors, photodiode, photomultiplier tubes, phototransistor, photoelectric detector, photoionization detector, photomultiplier, photo-resistor, pressure detector, barometer, tactile detector, heat flux detector, temperature gauge, thermistor, triangulation detector, inductive detector, lab-on-a-chip, and the like. The term "detector" used herein can be used interchangeably with the term "sensor."

The network protocols that can be used herein can include one or more of Bluetooth protocols, fibre channel network protocols, Internet protocol suite, transmission control protocol (TCP), open systems interconnection (OSI) protocols, routing protocols, a chatting messenger protocol, real time publish subscribe (RTPS) protocol, secure shell (SSH) protocol, file transfer protocol (FTP), simple mail transfer protocol (SMTP), telephone network (Telnet), hyper text transfer protocol (HTTP), secure hyper text transfer protocol (HTTPS), secure file transfer protocol (SFTP), and secure socket layer (SSL).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As can be used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network (LAN), a wide area network (WAN), and the Internet.

The implementations set forth in the foregoing description do not represent all implementations consistent with the subject matter described herein; instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the claims.

What is claimed is:

1. A lighting device comprising:
a plurality of light sources comprising a first set of one or more light sources and a second set of one or more light sources, the first set of one or more light sources configured to be powered by direct current, the second set of one or more light sources configured to be powered by alternating current;
electronic circuitry comprising a sensor that determines activity of an individual and a microprocessor operably coupled to the sensor; and
a housing encompassing the first set of one or more light sources, the second set of one or more light sources, and the electronic circuitry, the housing configured to be electrically combined with a ballast prefixed in a light fixture to power the first set of one or more light sources and configured to be removably fitted into the light fixture, the microprocessor configured to power the second set of one or more light sources upon the detection of the activity of the individual.

2. The lighting device of claim 1, wherein:
the first set of one or more light sources comprises light emitting diodes configured to be powered by up to twelve volts of direct current; and
the second set of one or more light sources comprises a fluorescent light configured to be powered by alternating current between one hundred and ten volts and two hundred and thirty volts.

3. The lighting device of claim 1, wherein the ballast prefixed within the light fixture is configured to provide the lighting device at least five hundred volts of alternating current at a frequency of at least twenty kilohertz.

4. The lighting device of claim 3, wherein the electronic circuitry within the lighting device is configured to reduce power generated by the at least five hundred volts of alternating current at the frequency of at least twenty kilohertz.

5. The lighting device of claim 1, wherein the electronic circuitry further comprises a transceiver operably coupled to the microprocessor, the transceiver allowing the microprocessor to communicate with a remote server via a communication network.

6. The lighting device of claim 5, wherein the communication between the microprocessor and the remote server enables the remote server to control the microprocessor to activate or deactivate at least one of the first set of one or more light sources and the second set of one or more light sources.

7. The lighting device of claim 1, wherein the housing is configured to be electrically combined with the ballast prefixed in the light fixture without modifying the light fixture.

8. The lighting device of claim 1, wherein the microprocessor is configured to deactivate the second set of one or more light sources when the sensor has failed to detect activity for a threshold amount of time.

9. The lighting device of claim 1, wherein a brightness of the second set of one or more light sources is more than a brightness of the first set of one or more light sources.

10. A method comprising:
electrically combining a lighting device with an instant start ballast prefixed in a lighting fixture without modifying the lighting fixture, the lighting device comprising:
a plurality of light sources comprising a first set of one or more light sources and a second set of one or more light sources, the first set of one or more light sources and the second set of one or more light sources configured to power at different electrical input values;
electronic circuitry comprising a frequency sensor that determines an activity of an individual and a microprocessor operably coupled to the frequency sensor, the electronic circuitry further comprising a transformer configured to operably couple with the instant start ballast; and
a housing encompassing the one or more light sources and the electronic circuitry, the housing configured to be electrically combined with the instant start ballast prefixed in the light fixture to power the first set of one or more light sources and configured to be removably fitted into the lighting fixture, the microprocessor configured to power the second set of one or more light sources upon the detection of the activity of the individual; and
communicatively coupling the microprocessor with a server via a communication network, the communicative coupling enabling the server to remotely vary dimming luminosity of at least one of the first set of one or more light sources and the second set of one or more light sources.

11. The method of claim 10, wherein the instant start ballast prefixed within the light fixture is configured to provide the lighting device at least five hundred volts of alternating current at a frequency of at least one hundred kilohertz.

12. The method of claim 11, wherein the electronic circuitry within the lighting device is configured to reduce power generated by the at least five hundred volts of alternating current at the frequency of at least one hundred kilohertz.

* * * * *